(12) United States Patent
Kaku et al.

(10) Patent No.: US 6,282,235 B1
(45) Date of Patent: Aug. 28, 2001

(54) SIGNAL PROCESSING APPARATUS

(75) Inventors: Takashi Kaku; Yasuhide Kihara, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/657,593

(22) Filed: Sep. 8, 2000

Related U.S. Application Data

(62) Division of application No. 08/543,056, filed on Oct. 13, 1995, now Pat. No. 6,154,190.

(30) Foreign Application Priority Data

Oct. 13, 1994 (JP) .................................................... 6-248170

(51) Int. Cl.$^7$ ................................................. H04B 3/36
(52) U.S. Cl. ......................... 375/211; 375/220; 375/377; 455/557; 370/420; 379/442
(58) Field of Search .................................. 375/211, 214, 375/220, 222, 377, 257; 455/557; 379/442, 443; 370/419, 420, 421, 466, 467

(56) References Cited

U.S. PATENT DOCUMENTS

| | | |
|---|---|---|
| 4,060,797 | 11/1977 | Maxwell et al. . |
| 4,716,562 * | 12/1987 | Carse et al. .......................... 370/294 |
| 4,902,547 | 4/1990 | Murakami . |
| 5,032,819 * | 7/1991 | Sakuragi et al. ..................... 375/222 |
| 5,239,580 * | 8/1993 | Bruno et al. ......................... 379/443 |
| 5,502,750 | 3/1996 | Co et al. . |
| 6,122,527 * | 9/2000 | Robinson et al. ................... 455/557 |

FOREIGN PATENT DOCUMENTS

| | | |
|---|---|---|
| 2 241 854 A | 9/1991 | (GB) . |
| 2 267 801 A | 12/1993 | (GB) . |
| 2 292 291 A | 2/1996 | (GB) . |
| WO 95/22862 | 8/1995 | (WO) . |

OTHER PUBLICATIONS

Search Report Under Section 17; Feb. 4, 1999, Examiner Keith Williams.

* cited by examiner

*Primary Examiner*—Don N. Vo
(74) *Attorney, Agent, or Firm*—Armstrong, Westerman, Hattori, McLeland & Naughton, LLP

(57) ABSTRACT

A signal processing apparatus having a register unit with the number of bits required for signal processing, which is not larger than predetermined number of bits, and comprising a ROM which inputs, as an address signal, an output signal from the register unit or an input signal to the signal processing apparatus, and uses an input signal to the register unit as a part of an output signal from the ROM. This makes it possible to greatly reduce the cost of a system which executes complex processing yet requires a reduced number of bits in the input signals and a reduced number of bits for the register that is essentially required by reducing the amount of signal processing and the number of electric components, to greatly improve the quality of the apparatus accompanying the reduction in the number of electric components, and to cheaply increase the signal processing functions without decreasing the processing speed.

1 Claim, 26 Drawing Sheets

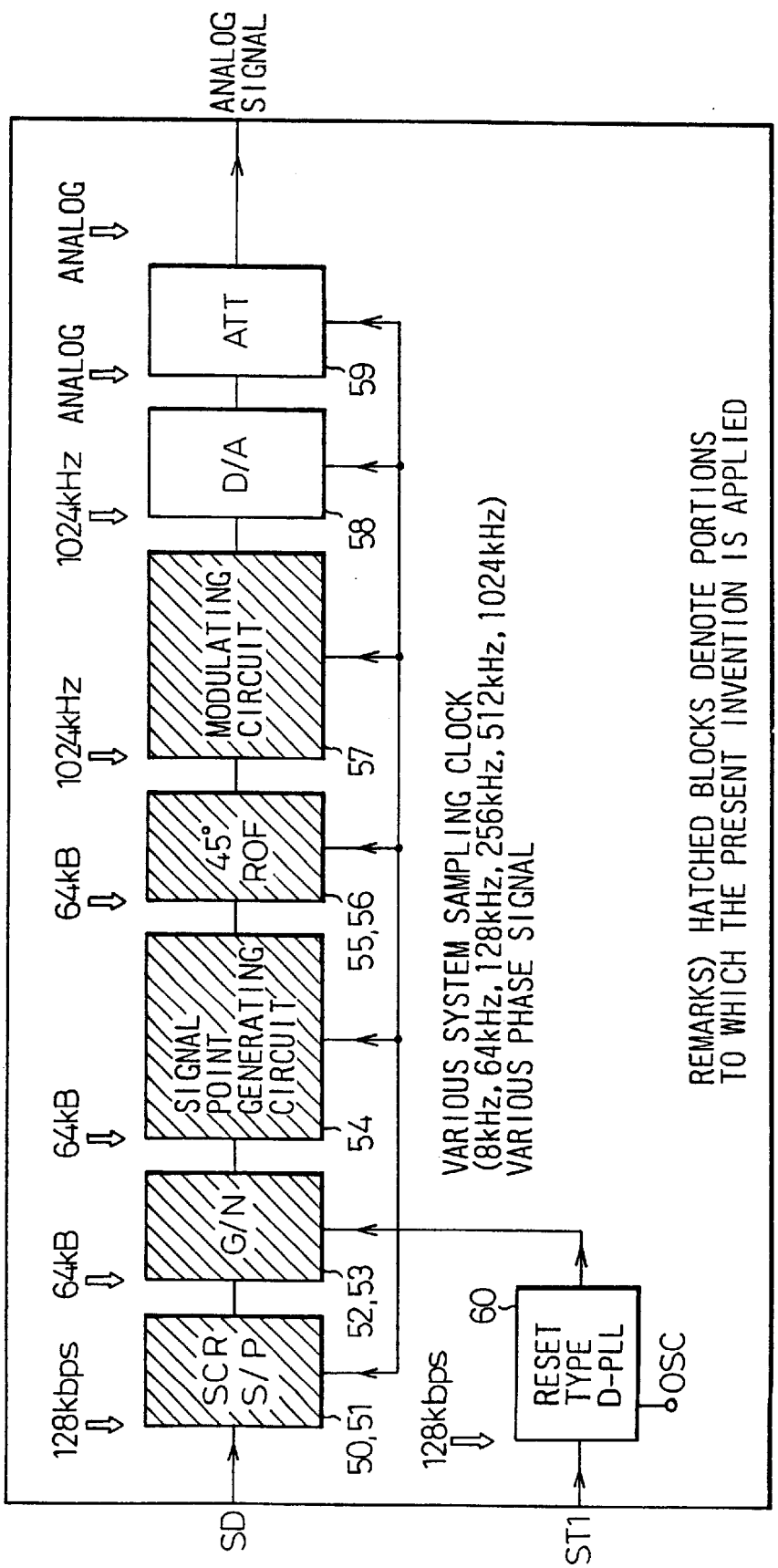

REMARKS) IN REGARD TO DETAILS OF CONTENTS OF SUM TABLE, REFER TO V.26 PURSUANT TO ITU-T RECOMMENDATION
(②:BIT NUMBER)

(②:BIT NUMBER)

C2  C4  C6  C8  C10  C12  C14  APPROXIMATE VALUE BY SAMPLING AT 256kHz
0.3, 0.5, 0.8, 1.0, 0.8, 0.5, 0.3

⟷ 1/64kHz (③:BIT NUMBER)

(③, ④ AND ⑧:BIT NUMBER)

SIGNAL PROCESSING APPARATUS

This application is a division of application Ser. No. 08/543,056 filed Oct. 13, 1995 now U.S. Pat. No. 6,154,190.

BACKGROUND OF THE INVENTION

1. Field of the Invention

The present invention relates to a signal processing apparatus. More specifically, the invention relates to a signal processing apparatus such as a terminal interface (DTE (data terminal equipment)—DCE (data circuit equipment) interface) used for a private high-speed modem and the like, or to a system which executes complex processing requiring a decreased number of bits in the input signals and a decreased number of bits for registers that are essentially required, such as a private high-speed data transfer apparatus using a modem, a high-speed data transfer apparatus for CATV network using a band compression system, a digital VTR and a magnetic disk apparatus.

An apparatus for supporting high-speed data requires connectors V.35/X.21 in addition to a connector V.28 recommended by ITU-T (International Telecommunication Union—Telecommunication Recommendation).

Therefore, a private high-speed modem must be equipped with the above-mentioned three kinds of connectors. That is, use of the connectors of different kinds requires three times as many instruments for maintenance as in the case in which the same kinds of connectors are usually used, and the cost for property management regarding these different kinds of connectors increases to three times as much as usual.

In these systems, it is required to collectively execute maintenance at one time in a more simplified manner in order to realize high-speed and complex signal processing at the reduced cost.

2. Description of the Related Art

In a conventional signal processing apparatus which uses several kinds of physically different connectors, signal processing functions must be separately provided by being connected to these connectors.

That is, in the conventional signal processing apparatus, the signal processing functions required by the system are separately realized by hardware, which causes problems in that the number of electric components increases and a production cost of the apparatus increases with an increase in the signal processing functions and that the quality of the signals processed by the apparatus decreases. Besides, the speed of signal processing decreases with an increase in the number of electric components.

In order to clarify the problems inherent in the conventional signal processing apparatus, described below with reference to FIG. 1 is the constitution of a terminal interface which is related to the conventional signal processing apparatus.

According to the prior art as shown in FIG. 1, the terminal interface possesses connectors $90_1$ to $90_3$ in a number equal to the number of a plurality of channels that connect to plural kinds of data terminal equipment that operates under different interface conditions and driver/receiver units $91_1$ to $91_3$ in a number equal to the number of a plurality of channels to convert levels of transmission and reception signals, the driver/receiver units $91_1$ to $91_3$ being connected to separate communication circuits.

Moreover, each communication circuit is provided with a modem for each terminal equipment.

In a conventional terminal interface related to the thus constituted signal processing apparatus, separate communication circuits and modems have been provided and connected for plural kinds of data terminal equipment that operates under different interface conditions.

When the kinds of the apparatus are to be increased, therefore, related devices such as facilities of separate circuits and switches must be newly provided resulting in an increase in the cost.

SUMMARY OF THE INVENTION

The present invention was accomplished in view of the above-mentioned problems, and its main object is to greatly reduce the cost of a system (which is not limited to a field of data transmission only) which executes complex processing yet requires a reduced number of bits in each input signal and a reduced number of bits for registers that are essentially required by reducing the amount of signal processing and the number of electric components, to greatly improve the quality of the apparatus accompanying the reduction in the number of electric components, and to cheaply increase the signal processing functions without decreasing the processing speed.

Another object of the present invention is to provide a terminal interface which enables data terminal equipment that allows a plurality of different interface conditions to be connected to a shared circuit without requiring any related device such as a circuit or a switch, contributes to reducing the size and cost of the apparatus without the need of developing any related device, and makes it easy to increase the kinds of the devices having various interface conditions at the reduced cost. In order to accomplish the above-mentioned objects, the present invention provides a signal processing apparatus comprising a register unit having a number of bits required for the processing that is not greater than a predetermined number of bits, and a ROM which inputs, as an address signal, an output signal from the register unit or an input signal to the signal processing apparatus, and uses an input signal to the register unit as a part of an output signal from the ROM.

Preferably, the signal processing apparatus of the present invention comprises an input signal latch circuit for holding an input signal to the signal processing apparatus in response to a system clock, and an output signal latch circuit for holding an output signal from the ROM in response to a system clock.

More preferably, the signal processing apparatus of the present invention comprises an input signal latch circuit for holding an input signal to the signal processing apparatus in response to a system clock, a selecting circuit for selecting an address signal to the ROM out of a plurality of input signals to the signal processing apparatus in response to a selection signal, and an output signal latch circuit for holding an output signal from the ROM in response to the system clock when the address signal is selected by the selection signal.

Moreover, the signal processing apparatus of the present invention, including a terminal interface, comprises connectors of a number equal to the number of a plurality of channels that connect to plural kinds of data terminal equipment which operates under different interface conditions, level conversion units of a number equal to the number of a plurality of channels that are connected to the connectors to convert levels of the transmission and reception signals, and a DC branching unit that is connected to the level conversion units and has a DC branching function for the plurality of channels, wherein connection is controlled between the data terminal equipment and circuit end equipment provided at a data circuit side, by the DC branching unit.

In the signal processing apparatus of the present invention, an input signal is input to the signal processing apparatus as an address signal of the ROM. Then, the data stored in a memory region designated by the address signal is output from the ROM, and a part of the output signal from the ROM is output to the system and is used as an output signal of the system, and another part thereof or the whole of the remaining part thereof is used as an input signal to the register unit that is essentially required.

Therefore, the address value designating the ROM is expanded, I/O is expanded, and the memory region of ROM is efficiently utilized without waste.

Accordingly, it is possible to greatly reduce the cost of a system which executes a complex process yet requires a reduced number of bits in each input signal and the reduced number of bits for the registers that are essentially required by reducing the amount for signal processing and the number of electric components, to greatly improve the quality of the apparatus accompanying the reduction in the number of electric components, and to cheaply increase the signal processing functions without decreasing the processing speed.

When the signal processing apparatus of the present invention includes a terminal interface, furthermore, the transmission signals (i.e., transmission data) sent, via the connectors, from terminal equipment under different interface conditions, are converted into signals of TTL levels through the level conversion units and are collected together by the DC branching unit.

On the other hand, the reception signals (i.e., reception data) from the circuit side are distributed by the DC branching unit to the connectors, and these connectors output the reception signals to the terminal equipment.

In this case, unlike the prior art, it is necessary to provide only one input terminal of the DC branching circuit or the like, in order to receive various data transferred from the data circuit side.

Therefore, the signal processing apparatus does not require any switch for changeover (i.e., selection) of various data.

In the above-mentioned signal processing apparatus equipped with the DC branching function, it is possible to connect the data terminal equipment in compliance with a plurality of different interface conditions to a shared circuit without using any switch. Accordingly, there is no need to develop a plurality of related devices. Besides, since the DC branching function can be obtained in the form of an LSI, the apparatus can be realized in a small size and at the reduced cost.

BRIEF DESCRIPTION OF THE DRAWINGS

The above object and features of the present invention will be more apparent from the following description of the preferred embodiments with reference to the accompanying drawings, wherein:

FIG. 6 is a block diagram illustrating a transmission unit according to a first embodiment of the present invention;

DESCRIPTION OF THE PREFERRED EMBODIMENTS

Hereinafter, a description of some preferred embodiments according to the present invention will be given with reference to the accompanying drawings from FIG. 2 through FIG. 26.

Figure 2:
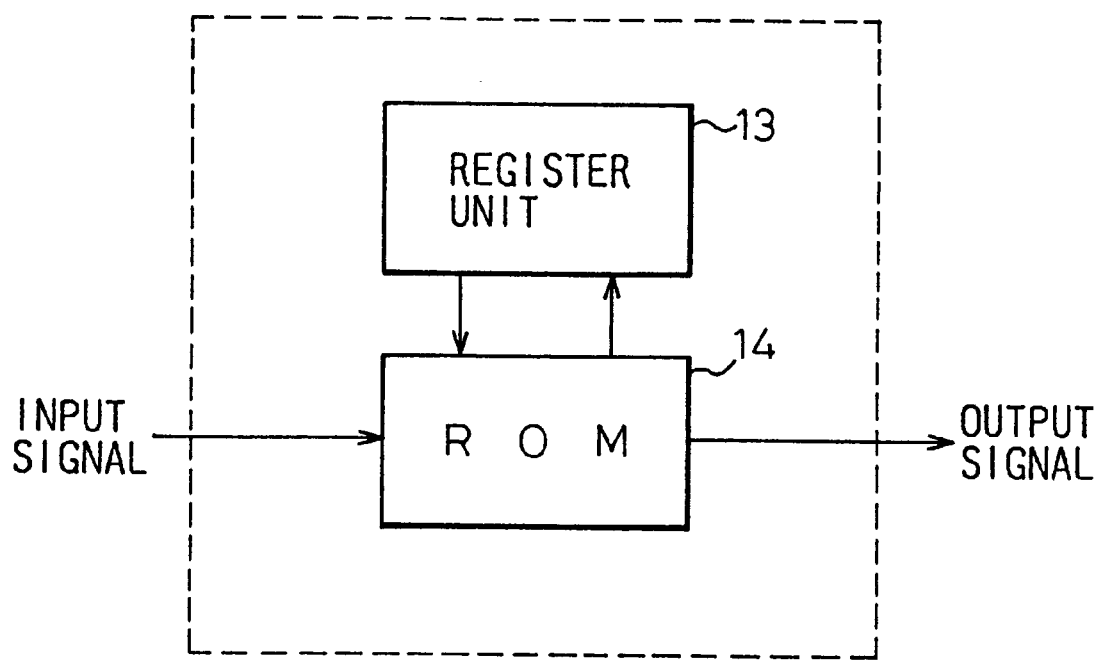
FIG. 2 is a block diagram illustrating an embodiment based upon a first principle of the present invention.

FIG. 2 is a block diagram illustrating an embodiment based upon a first principle of the present invention.

Referring to FIG. 2, the signal processing apparatus based upon the first principle of the present invention has a register unit 13 with the number of bits required for signal processing which is less than a predetermined number of bits, and further has a ROM 14 which inputs, as an address signal, an output signal of the register unit 13 or an input signal to the signal processing apparatus, and uses an input signal to the register unit 13 as a part of an output signal from the ROM 14.

Here, "predetermined number of bits" is not greater than the maximum number of bits that are capable of designating a maximum address number of the ROM.

The "register unit" is not limited to a single register but may include a plurality of various registers. Here, however, the registers are limited to only those which are essentially required.

The "ROM" stands for a read only memory which works as a register unit that is essentially required and stores bit data that are essentially required.

In the signal processing apparatus of FIG. 2, the signal is input to the signal processing apparatus as an address signal for the ROM 14.

Then, data stored in a memory region designated by the address signal is output from the ROM 14, a part of the output signal from the ROM 14 is output to the system where it is used as an output signal of the system, and another part thereof or the whole remainder thereof is used as an input signal to the register unit 13 that is essentially required.

Figure 3:
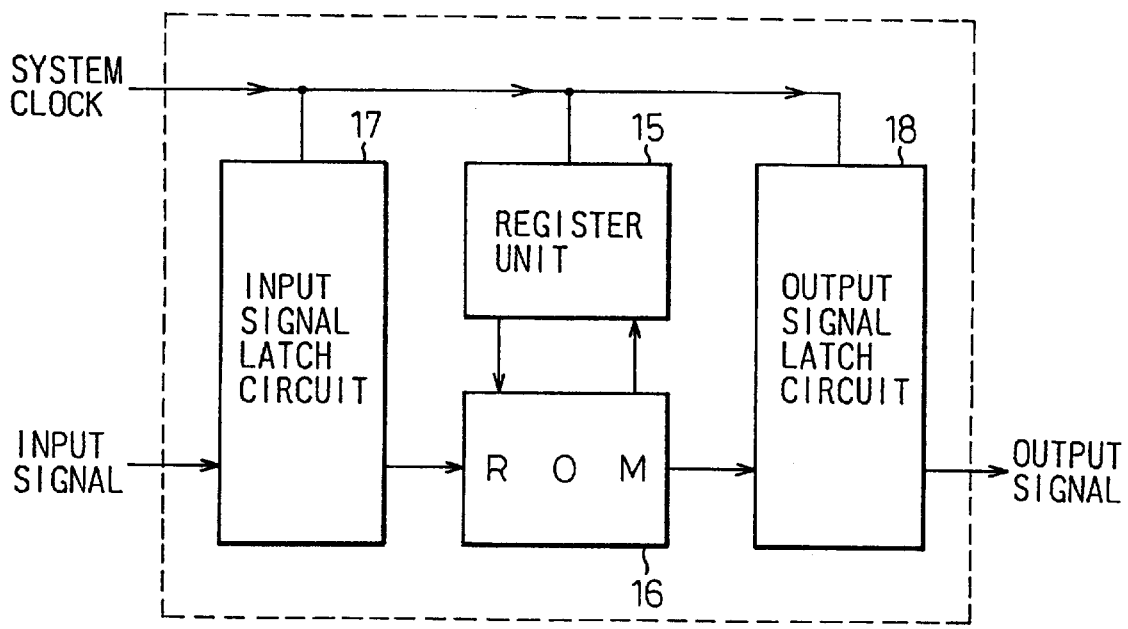
FIG. 3 is a block diagram illustrating an embodiment based upon a second principle of the present invention.

FIG. 3 is a block diagram illustrating an embodiment based upon a second principle of the present invention.

Referring to FIG. 3, the signal processing apparatus based upon the second principle of the present invention has a register unit 15 which has a number of bits required for signal processing that is less than a predetermined number of bits and operates in response to a system clock. The signal processing apparatus further has a ROM 16 which inputs, as an address signal, an output signal of the register unit or an input signal to the apparatus and uses an input signal to the register unit as a part of the output signal therefrom, an input signal latch circuit which holds an input signal to the apparatus in response to a system clock, and an output signal latch circuit 18 which holds an output signal from the ROM in response to the system clock.

Here, the "system clock" stands for an operation clock (sampling clock) required by the system, and the input/output contents and the contents of the registers are updated in response to this clock.

In the signal processing apparatus of FIG. 3, the input/output contents in the input signal latch circuit 17 and output signal latch circuit 18, and the contents of the registers in the register unit 15 are updated in response to the system clock. This embodiment corresponds to a synchronous system.

Figure 4:
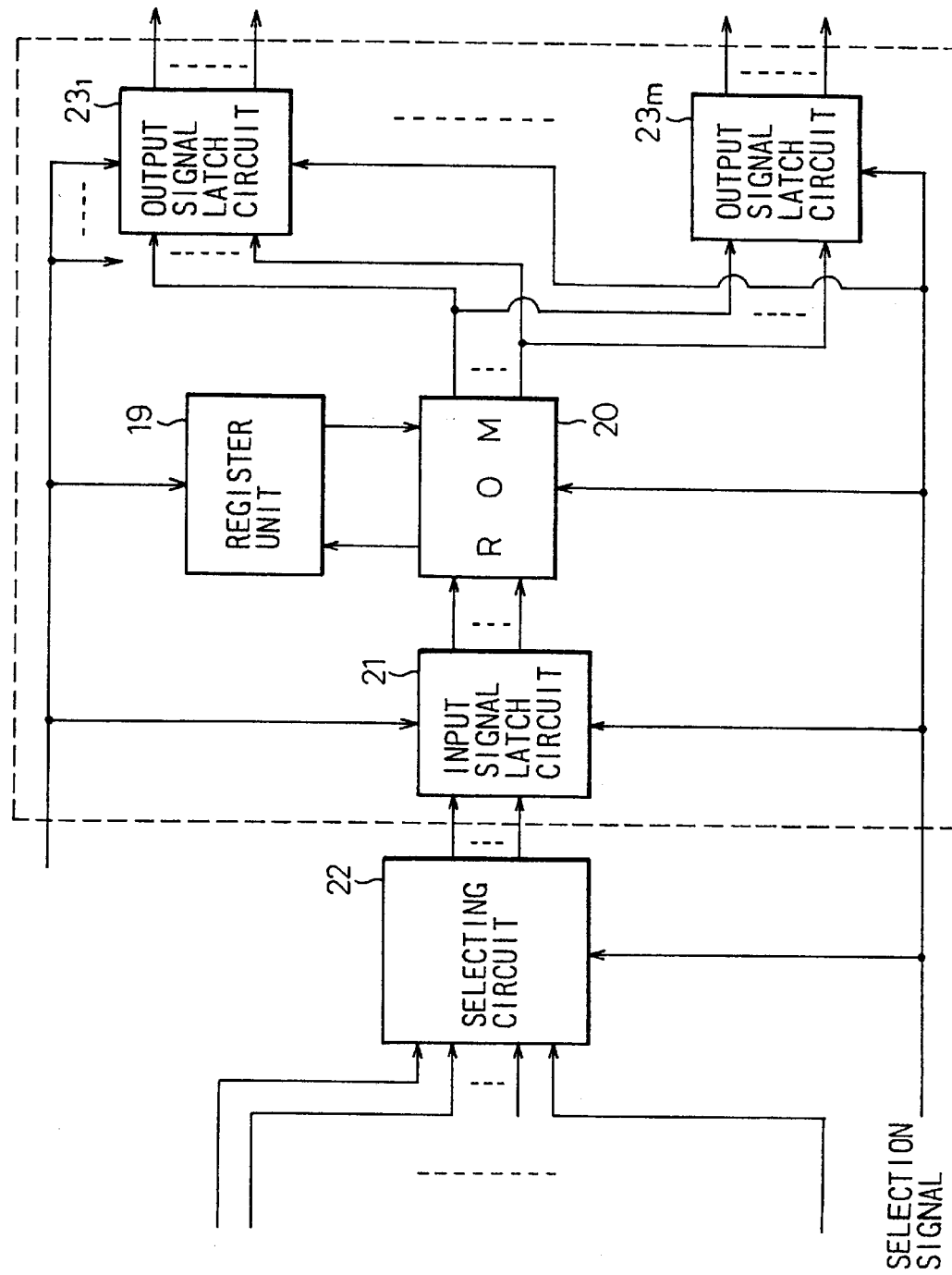
FIG. 4 is a block diagram illustrating an embodiment based upon a third principle of the present invention.

FIG. 4 is a block diagram illustrating an embodiment based upon a third principle of the present invention.

Referring to FIG. 4, the signal processing apparatus has a register unit 19 that has a number of bits required for signal processing that is less than a predetermined number of bits and operates in response to the system clock. The signal processing apparatus further has a ROM 20 which inputs, as an address signal, an output signal of the register unit or an input signal to the apparatus, which uses an input signal to the register unit as a part of an output signal therefrom, and in which the memory region corresponding to the address signal is changed over by a selection signal; an input signal latch circuit 21 for holding an input signal to the apparatus in response to the system clock; a selecting circuit 22 for selecting an address signal for the ROM out of a plurality of input signals to the apparatus in response to a selection signal; and output signal latch circuits $23_1$ to $23_m$ for holding the output signal from the ROM in response to the system clock.

The embodiment of FIG. 4 is intended to expand the I/O (input/output) for the ROM.

In FIG. 4, the selecting circuit 22 is provided on the side, opposite to the ROM 20, of the input signal latch circuit 21. The selecting circuit, however, may be provided on the ROM 20 side. In this case, however, the input signal latch circuits must be provided in a plural number preceding the selecting circuit.

In the signal processing apparatus provided with the selecting circuit 22 as shown in FIG. 4, a signal line that is to be used as an address signal for the ROM is selected out of a plurality of signal lines in response to a selection signal, in order to give an address signal to the ROM.

In this case, a memory region is selected in the ROM that corresponds to the address signal line selected by the selection signal. Similarly, the signal that is output is held by any one of the output signal latch circuits $23_1$ to $23_m$ selected by the selection signal.

Accordingly, the address value designating the ROM is expanded, the I/O is expanded, and the memory region of the ROM can be efficiently utilized without waste.

Figure 5:
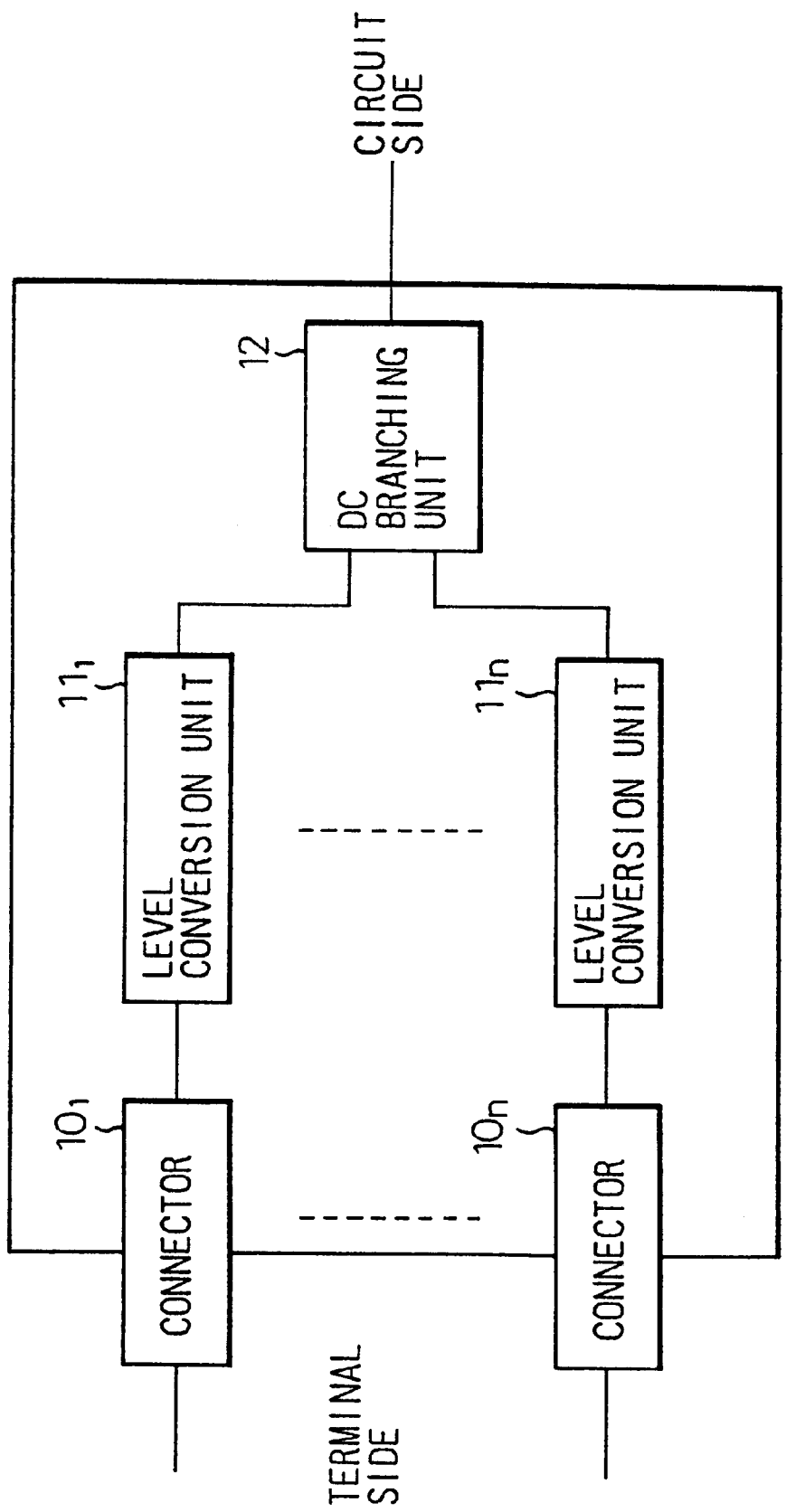
FIG. 5 is a block diagram illustrating an embodiment based upon a fourth principle of the present invention.

FIG. 5 is a block diagram illustrating an embodiment based upon a fourth principle of the present invention.

In the signal processing apparatus based upon a fourth principle of the present invention as shown in FIG. 5, provision is made of connectors $10_1$ to $10_n$ of a number equal to the number of a plurality of channels connected to plural kinds of data terminal equipment that operates under different interface conditions, level conversion units $11_1$ to $11_n$ of a number equal to the number of a plurality of channels that are connected to the connectors and convert levels of the transmission and reception signals, and a DC branching unit 12 having a DC branching function for the plurality of channels, and wherein connection is controlled between the data terminal equipment and the circuit end equipment.

Here, the "interface conditions" include not only physical conditions related to hardware as stipulated under V.28, V.35 or X.21 of ITU-T Recommendations but also electrical conditions or logical conditions.

V.28 is related to electrical characteristics of an unbalanced double-current mutually connected circuit, V.35 is related to 48 kbps data transmission using a 60 to 108 kHz group frequency band circuit, and X.21 is related to general-purpose interfaces of DTE and DCE which operate in synchronism on a public data network.

The "level conversion unit" corresponds to an interface conversion unit, or to the driver/receiver in the embodiment.

The "DC branching function" is a function for collecting the transmission data and for distributing the reception data.

In the signal processing apparatus including the terminal interface shown in FIG. 5, the transmission signals sent, via connectors $10_1$ to $10_n$ from the terminal equipment operating under different interface conditions are converted into signals of TTL levels or the like through the level conversion units $11_1$ to $11_n$ and are collected by the DC branching unit 12.

On the other hand, the reception signals from the circuit side are distributed by the DC branching unit 12 to the connectors $10_1$ to $10_n$, and these connectors $10_1$ to $10_n$ output the reception signals to the terminal equipment.

Figure 1:
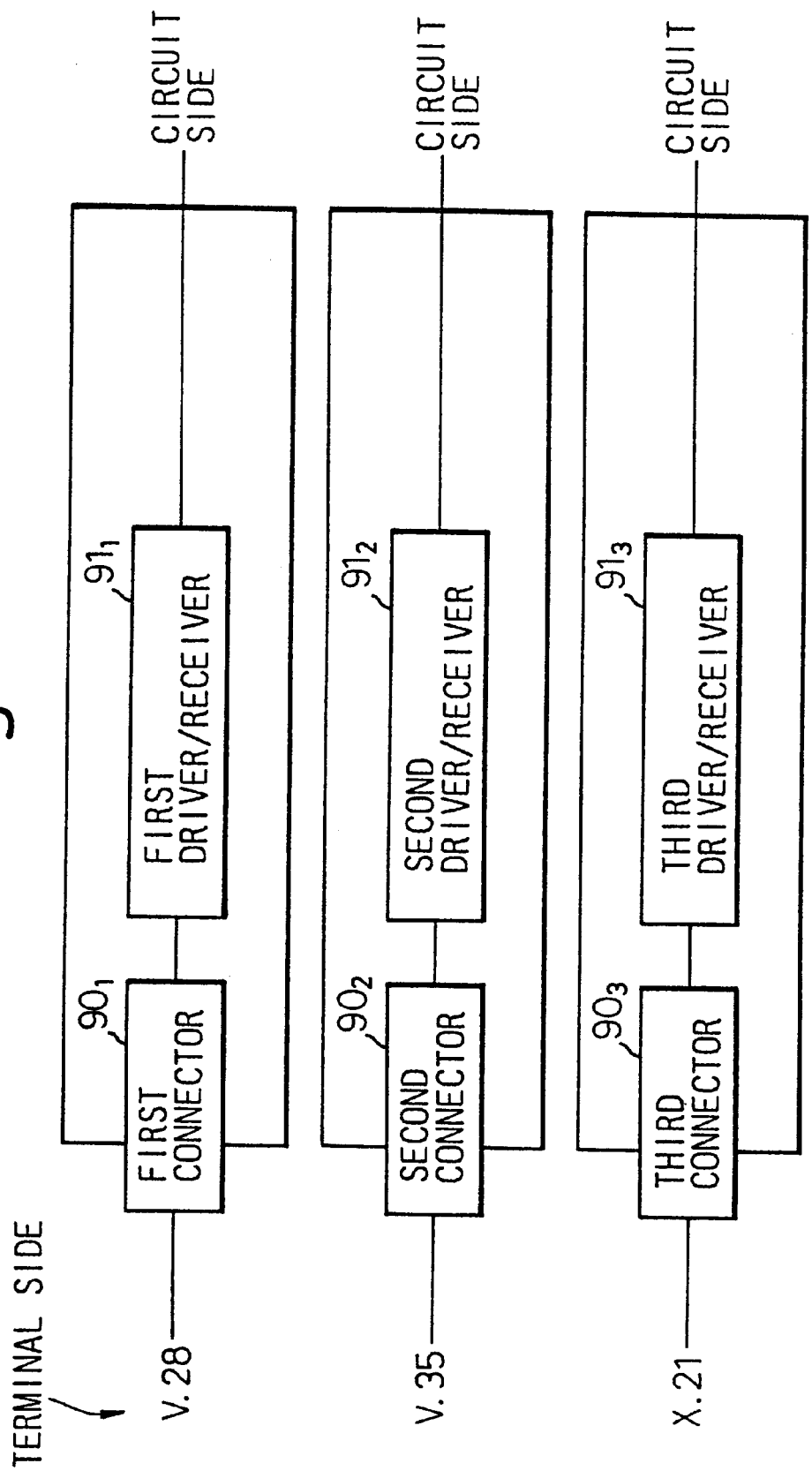
FIG. 1 is a block diagram illustrating the constitution of a terminal interface related to a conventional signal processing apparatus.

In the embodiment shown in FIG. 5, unlike the prior art shown in FIG. 1, it is necessary to provide only one input terminal of the DC branching unit 12 or the like, in order to transfer various data corresponding to the reception signals from the data circuit side to the terminal side. Therefore, the signal processing apparatus of FIG. 5 does not require any switch for selection of various data.

Next, described below in detail is the first embodiment of the signal processing apparatus based upon the first principle of the present invention as a private modem of 128 kbps.

FIG. 6 is a block diagram illustrating a transmission unit according to the first embodiment of the present invention.

Referring to FIG. 6, the transmission unit according to this embodiment includes a scramble equalizing circuit (usually abbreviated as SCR or often referred to as scrambler) 50 which arranges the input data in a random fashion so that the timing can be easily reproduced on the receiving side, an S/P conversion circuit 51 which converts serial outputs of the scrambler 50 into parallel outputs (2 bit/bauds), a G/N conversion circuit 52 which converts a gray code into a natural code, a sum equalizing circuit 53 which adds a phase shift amount of 90 degrees on the sending side so that the data can be correctly reproduced in the receiving side even when the phase is rotated (i.e., shifted) on the circuit equipment, a signal point generating circuit 54 for generating a signal point in each of signals of four values on the sending side, a 45-degree circuit 55 that rotates (i.e., shifts) the phase by 45 degrees to facilitate the reproduction of timings on the receiving side with signals of four values as eight false phases, an ROF (roll-off filter) circuit 56 for expanding a value of the sampling frequency 16 times, a modulating circuit 57 for modulation with 256 kHz carrier, a D/A conversion circuit 58 for converting digital signals into analog signals, an ATT (attenuator) equalizing circuit 59 for adjusting the level on the sending side, and a reset type D-PLL circuit 60 which is a phase-synchronizing circuit of digital phase locked loop and works in phase with a system clocks of 128 kHz input from an external unit.

In FIG. 6, hatched blocks represent portions to which the present invention is applied.

In this embodiment, data transmission is effected based upon the PSK (phase shift keying, phase modulation) system. This system enables data to be transmitted at the highest speed without interference among the codes.

The signal processing apparatus according to the present invention will be applied to each of the above-mentioned circuits or to all of the circuits.

However, signal processing having a large number of bits is not favorably handled by the ROM. Therefore, when a scale of hardware related to signal processing does not so much increase even in the case in which the signal processing is executed by an individual hardware, the signal processing is favorably carried out by an individual hardware device. In the above-mentioned transmission unit, therefore, the present invention is applied to the scramble equalizing circuit 50, S/P conversion circuit 51, G/N conversion circuit 52, sum equalizing circuit 53, signal point generating circuit 54, 45-degree circuit 55, ROF circuit 56, and modulating circuit 57. The present invention, however, is not applied to the D/A conversion circuit 58, ATT equalizing circuit 59 and D-PLL circuit 60, which, therefore, are realized as individual hardwares devices.

Described below is the whole operation of the transmission unit shown in FIG. 6.

Transmission data SD that are input are fed to the SCR circuit (scrambler, scramble equalizing circuit) 50, arranged in a random fashion, and are converted from serial data into parallel data (two (2) bits/bauds) through the S/P (serial to parallel) conversion circuit 51.

Thereafter, gray codes are converted into natural codes through the G/N (gray to natural) conversion circuit 52.

Furthermore, the phases are added up together by the sum equalizing circuit 53. Then, a signal point in each of signals of four values is generated from a two (2) bit data.

Next, in order to facilitate a reproduction of timings on the receiving side, four values are turned into eight values by the circuit for rotating eight false phases.

Then, the modulating circuit 57 effects a modulation of transmission data, a digital signal output from the modulating circuit 57 is converted into an analog signal through the D/A conversion circuit, and the analog signal is sent onto the circuit via the ATT circuit 59.

The reset type D-PLL circuit 60 forms a variety of system sampling clocks in synchronism with the external signals ST1 shown in FIG. 6.

In FIG. 6, OSC denotes a master clock for a system, which is indispensable for the circuit operation.

An outline of the above-mentioned operation is nearly the same as the provisions of V.26 bis and V.27 bis of ITU-T Recommendations.

Figure 7A:
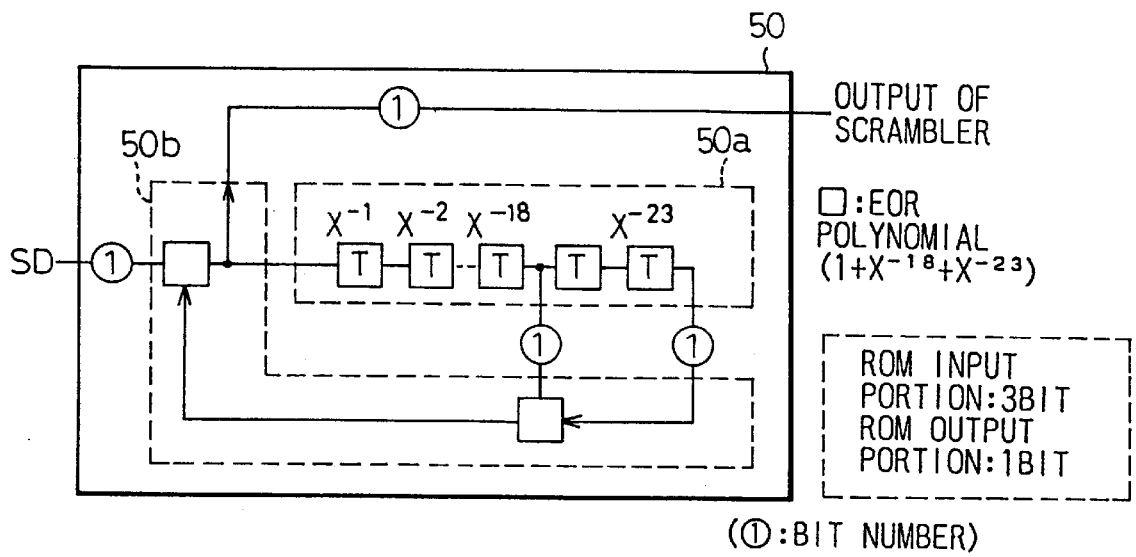
FIG. 7A is a diagram illustrating the original constitution of a scramble equalizing circuit to which a first embodiment of the present invention is applied.
Figure 7B:
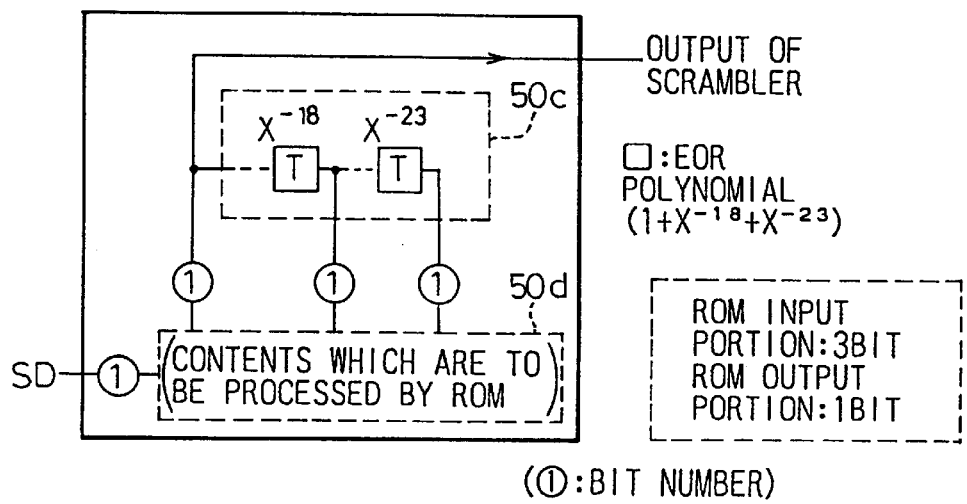
FIG. 7B is a diagram illustrating the scramble equalizing circuit according to a first embodiment of the present invention.

Described below are the circuits constituting the above-mentioned transmission unit according to the first embodiment of the present invention. FIGS. 7A and 7B illustrate a scramble equalizing circuit according to the second embodiment of the present invention. Hereinafter, the same constituent elements as those mentioned above are denoted by the same reference numerals.

The scramble equalizing circuit 50 works to arrange the input data in a random fashion, and is provided to facilitate the reproduction of timings on the receiving side. Details have been stipulated under V.29, etc. of ITU-T Recommendations.

FIG. 7A illustrates the scramble equalizing circuit 50 that is to be replaced by this embodiment. The scramble equalizing circuit 50 includes a register unit 50a consisting of delay lines with taps, and an arithmetic unit 50b consisting of exclusive OR (EOR) elements.

Here, each delay circuit has a delay time of 1/128 kHz (sec).

A polynomial $1+X^{-18}+X^{-23}$ is used in V.29, etc.

The input data produces a scramble data relying upon an exclusive logical sum (EOR) of $X^{-18}$ and $X^{-23}$, and the result is input to $X^{-1}$. This makes it possible to realize a random arrangement.

FIG. 7B illustrates a register unit 50c that is essentially required in the first embodiment of the present invention and a substituted ROM 50d. Here, the register unit, that is essentially required, is a register unit constituted by a minimum required number of various registers.

The register unit 50c is quite the same as the register unit 50a, and the arithmetic unit 50b is functionally the same as the ROM 50d.

Therefore, the scramble equalizing circuit according to the first embodiment of the present invention as a whole is the one shown in FIG. 7A that is equivalently converted from FIG. 7B.

In effect, the basic original equivalent circuit of FIG. 7A can be converted into a register plus ROM system that is shown in FIG. 7B.

In FIG. 7B, input signals to the ROM 50d consist of a signal of transmission data SD, an output $X^{-18}$ and an output $X^{-23}$. An output signal of the ROM 50d serves as an output of the scrambler. The contents of the ROM 50a are the logical sum of EOR.

More specifically, the value of polynomial $1+X^{-18}+X^{-23}$ is calculated in advance and stored in the ROM 50d. Further, the contents of the ROM 50d are retrieved on the basis of an address corresponding to $X^{-18}+X^{-23}$.

Figure 8A:
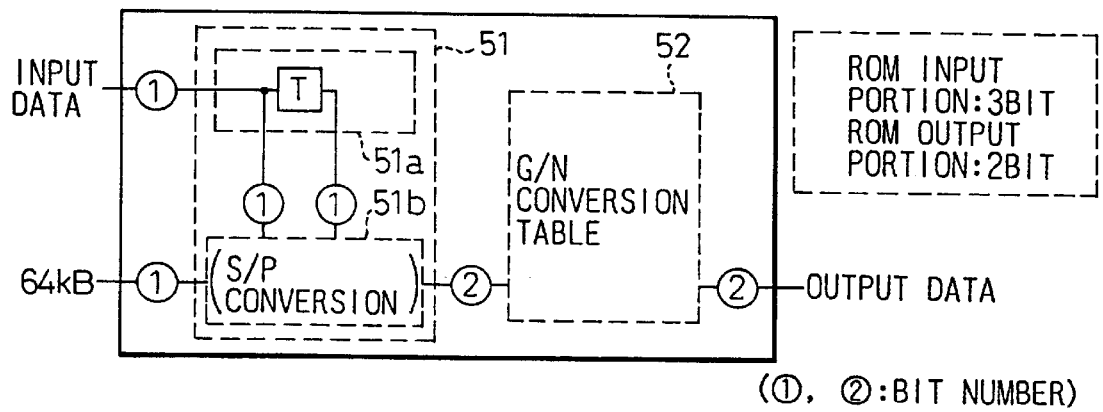
FIG. 8A is a diagram illustrating the original constitution of an S/P (serial to parallel) conversion circuit and a G/N (gray to natural) conversion circuit to which a second embodiment is applied.
Figure 8B:
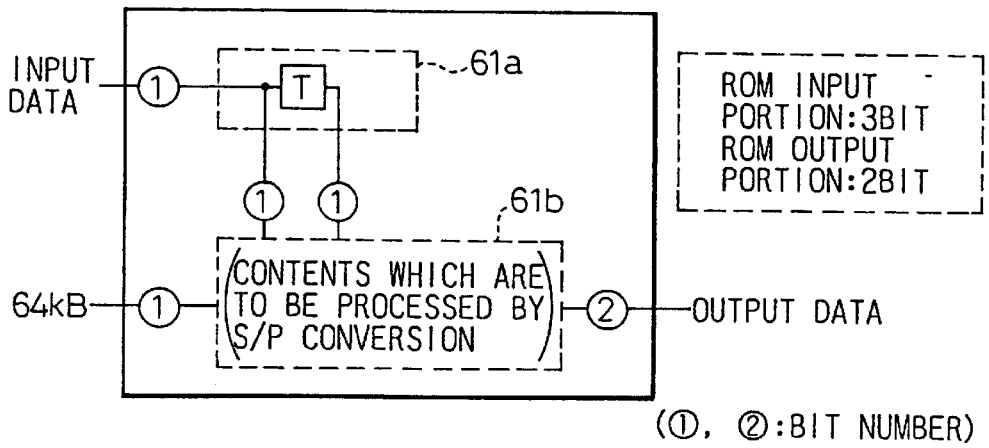
FIG. 8B is a diagram illustrating an S/P conversion circuit and a G/N conversion circuit according to a first embodiment of the present invention.

FIGS. 8A and 8B illustrate an S/P conversion circuit and a G/N conversion circuit according to the first embodiment of the present invention.

The S/P conversion circuit works to convert serial outputs of the scramble equalizing circuit into parallel outputs (2 bits/bauds). Here, serial data of 128 kbps are converted into parallel data of 64 kB.

The G/N conversion circuit works to convert gray codes into natural codes. Its details have been stipulated under V.26 of ITU-T Recommendations.

FIG. 8A illustrates the S/P conversion circuit 51 and the G/N conversion circuit 52 that are to be replaced by this embodiment.

FIG. 8B illustrates a synthesized circuit of FIG. 8A that is to be replaced by this embodiment, which includes a register unit 61a that is essentially required and consists of delay lines with taps (delay time is 1/64 kHz (sec)) and the replaced ROM 61b.

More specifically, parallel data, in which an S/P conversion has been carried out, is stored in advance in the ROM 61b. Further, on the basis of input data sent to the ROM 61b, corresponding output data is read out from the ROM 61b.

Figure 9A:
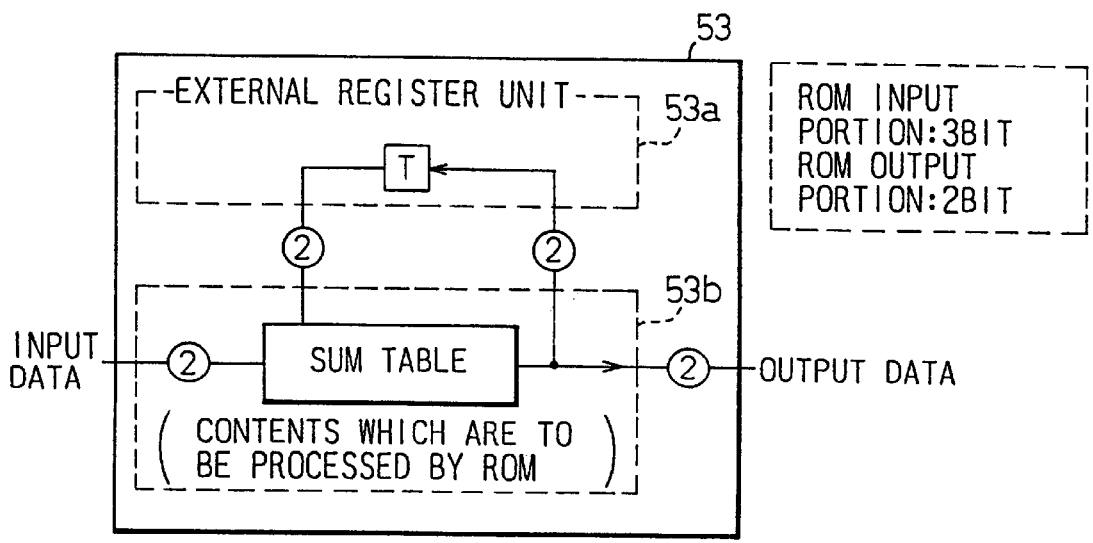
FIG. 9A is a diagram illustrating the original constitution of a sum equalizing circuit to which a first embodiment is applied.
Figure 9B:
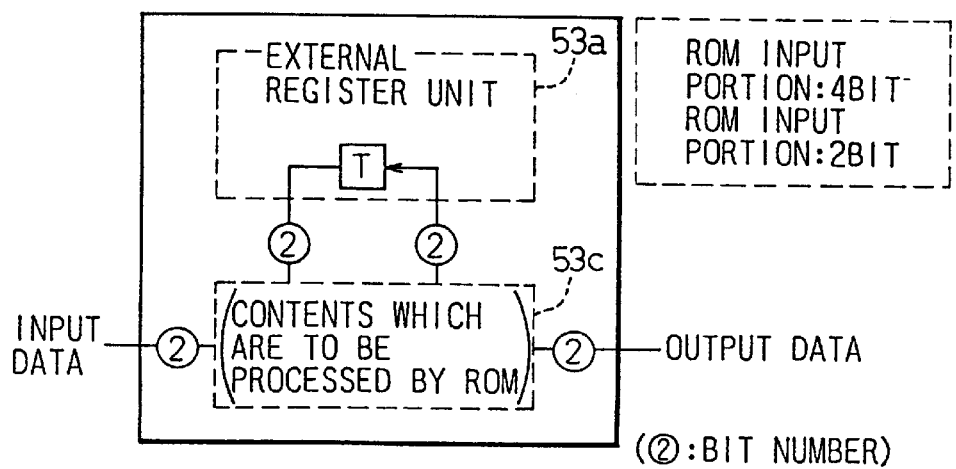
FIG. 9B is a diagram illustrating the sum equalizing circuit according to a first embodiment of the present invention.

FIGS. 9A and 9B are diagrams illustrating the sum equalizing circuit according to the second embodiment of the present invention.

The sum equalizing circuit 53 is a phase sum circuit for assuring the rotation of phase (i.e., phase shift) by 90 degrees. The phase shift amount is added in advance by 90 degrees on the sending side so that the data can be properly reproduced on the receiving side even when the phase is shifted on the circuit equipment. Its details have been stipulated under V.26 of ITU-T Recommendations.

FIG. 9A illustrates the sum equalizing circuit that is to be replaced by this embodiment.

This circuit includes a delay line 53a with tap (delay time is 1/64 kHz (sec)) and a sum table 53b. FIG. 9A and FIG. 9B are functionally the same. That is, FIG. 9A, that is equivalently converted into a register plus ROM system, becomes as shown in FIG. 9B. The contents of the sum table are functionally the same as the contents of the ROM 53c. However, it should be noted that the size of the ROM 53c is much smaller than that of the sum table 53b.

Figure 10A:
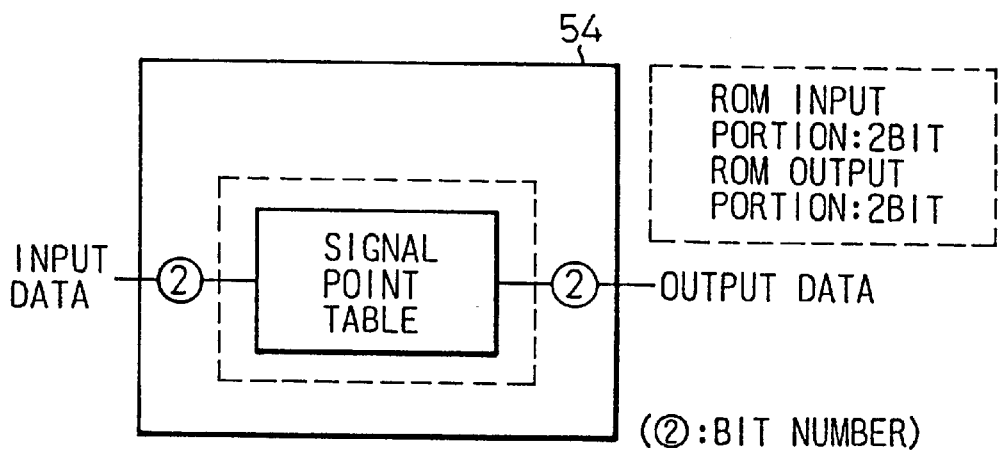
FIG. 10A is a diagram illustrating the original constitution of a signal point generating circuit and of a circuit for rotating eight dummy phases (i.e., false phases) according to a first embodiment.
Figure 10B:
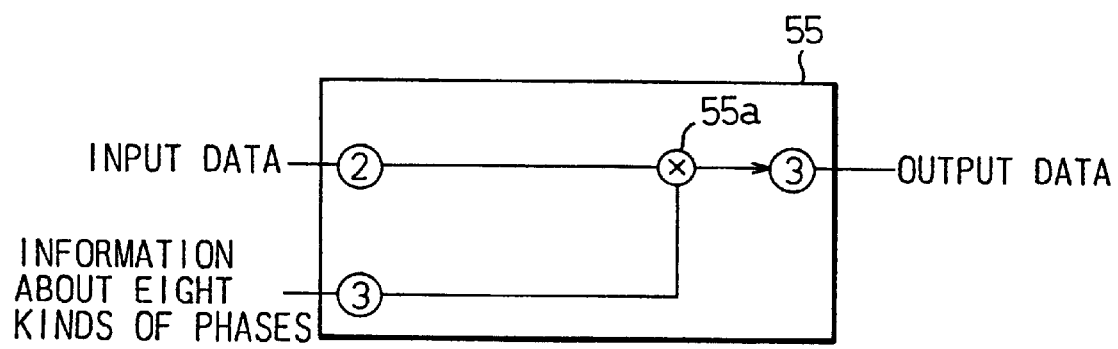
FIG. 10B is a diagram illustrating the signal point generating circuit and the circuit for rotating eight dummy phases according to a first embodiment of the present invention.

FIGS. 10A and 10B illustrate the signal point generating circuit 54 and the circuit 55 for rotating eight false phases according to the first embodiment of the present invention.

FIG. 10A illustrates the signal point generating circuit 54 which generates a point of the original signal that is to be transmitted. Here, a signal point of four values is generated on the sending side.

FIG. 10B illustrates the circuit 55 for rotating eight false phases, which is also called a 45-degree circuit and gives a phase rotation of 45 degrees to turn each signal of four values into a signal having eight false phases. Eight false phases make it easy to reproduce timings on the receiving side.

In the drawing, reference numeral 55a denotes a multiplier circuit.

The signal point generating circuit 54 of FIG. 10A outputs a signal point of four values for the input data of two bits using a ROM table (signal point table).

Due to the addition of phase rotation (i.e., phase shift amount) for generating eight phases, the input data of four values is rotated by information related to eight kinds of phases to output the data (eight values).

FIGS. 10A and 10B are functionally the same, but FIG. 10B is realized in the ROM plus register system.

Here, the information about eight kinds of phases shown in FIG. 10B is vector information having a radius 1, i.e., shift information for shifting each by 45 degrees from a position of 0 degree by a unit of 45 degrees successively. In other words, the information shown in FIG. 10B is information of three bits, a value of which representing the amount of rotation of phase (i.e., phase shift amount).

A point of input signal is multiplied by information about eight kinds of phases. For instance, when the input data has four values allocated to the radius 1 with a unit of 90 degrees, information about eight kinds of phases is multiplied to output eight values that are allocated with a unit of 45 degrees.

Figure 11A:
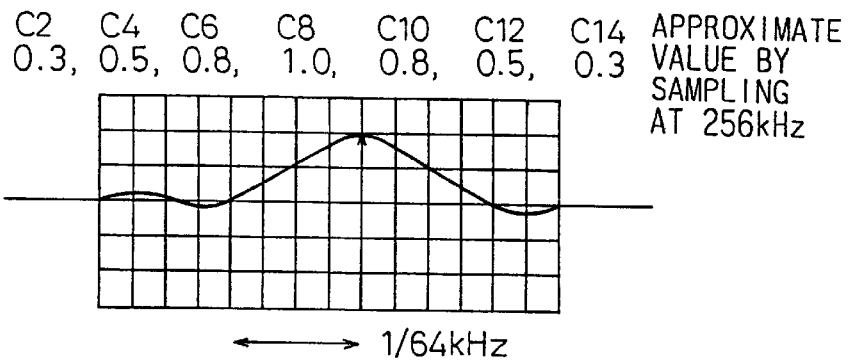
FIG. 11A is a diagram illustrating the ROF filter (roll-off filter) response characteristics of an ROF equalizing circuit according to a first embodiment of the present invention.
Figure 11B:
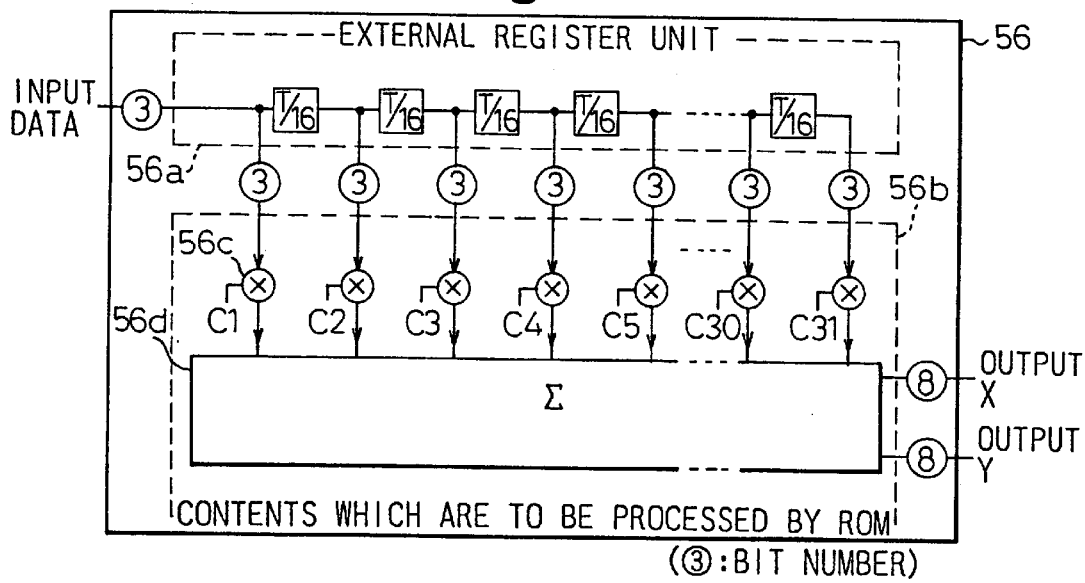
FIG. 11B is a diagram illustrating the original constitution of the ROF equalizing circuit to which a first embodiment of the present invention is applied.
Figure 11C:
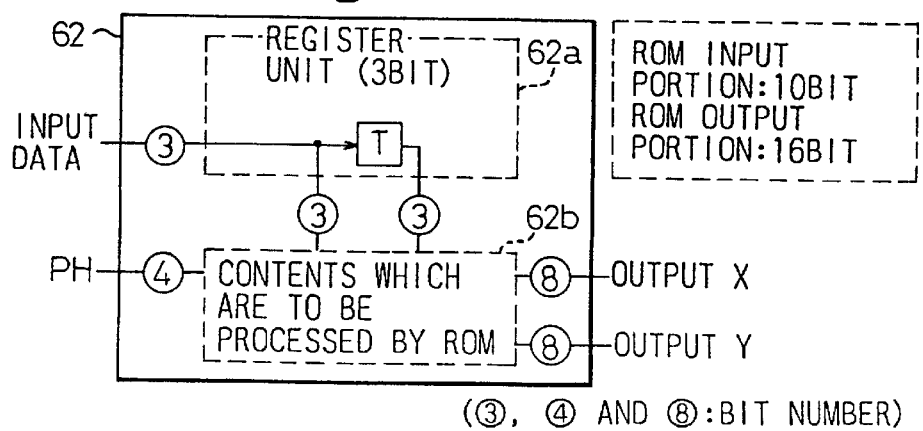
FIG. 11C is a diagram illustrating the ROF equalizing circuit according to a first embodiment of the present invention.

FIGS. 11A, 11B and 11C are diagrams illustrating the ROF equalizing circuit according to the first embodiment of the present invention.

Symbol ROF represents a roll-off filter circuit which serves as a 100% $COS^2ROF$. Here, a value of the sampling frequency is expanded to sixteen (16) times.

If described in further detail, FIG. 11A illustrates ROF filter response characteristics.

FIG. 11B illustrates an ROF circuit 56 that is to be replaced by this embodiment. The ROF circuit 56 includes a circuit 56a consisting of a delay line with taps (delay time is 1/1024 kHz (sec) per delay circuit), and an arithmetic unit 56b consisting of a multiplier circuit 56c and an adder circuit 56d.

The ROF circuit 56 comprises an ordinary transversal filter.

In the drawing, symbol T/16 denotes a delay line with tap having a baud rate of 1/16, and c1 to c31 denote tap coefficients of transversal filters.

The above-mentioned eight (8) value information (three (3) bits) is input as an input signal, and both a real part and an imaginary part are output as a filter output.

FIG. 11A illustrates an impulse response of the filter, wherein the time response serves as a tap coefficient of the transversal filter of FIG. 11B.

FIG. 11C illustrates a register unit 62a that is essentially required, and an ROF circuit 62 replaced by ROM 62b.

FIG. 11B illustrates an ordinary transversal filter.

Referring to FIG. 11C, in the register of three (3) bits are stored values of "000", "001", "010", "011", "100", "101", "110", and "111". The input information has a symbol unit (1/64 kHz) and is input to the register in a unit of 1/64 kHz. Therefore, information of three (3) bits is input to the delay line T/16 of FIG. 11B only once in 1/64 kHz, and "0" is input in the other time zone.

A signal PH input to the ROM 62b is phase information, and the baud rate is 64 kHz and the sampling rate is 1024 kHz. Therefore, 16 kinds of information (four (4) bit information) in a baud rate unit is necessary.

More specifically, a result of arithmetic operation, which will be output from the arithmetic unit 56b, is stored in advance in the ROM 62b. Further, the contents of the ROM 62b are retrieved by using two kind of values each having three bits and the signal PH. Consequently, a given signal corresponding to these two kind of values and the signal PH can be output from the ROM 62b. Therefore, in FIG. 11C, it is unnecessary to carry out an arithmetic operation for obtaining values corresponding to outputs of the arithmetic unit in FIG. 11B.

Figure 12A:
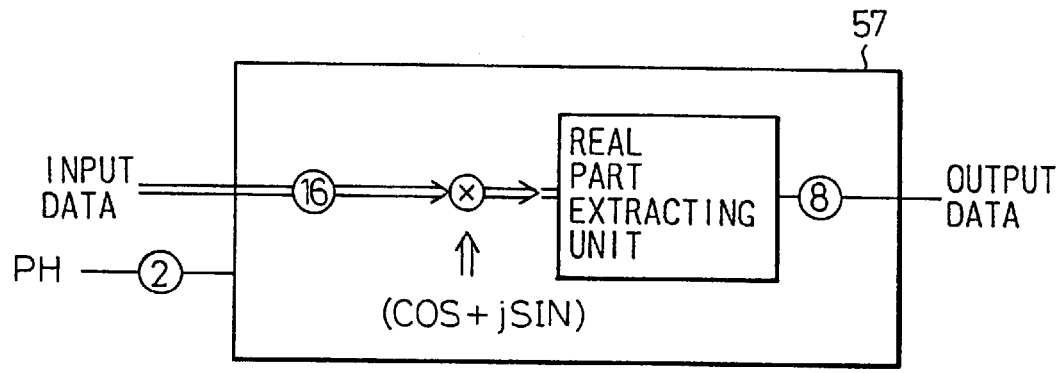
FIG. 12A is a diagram illustrating a modulation circuit according to a first embodiment of the present invention.
Figure 12B:
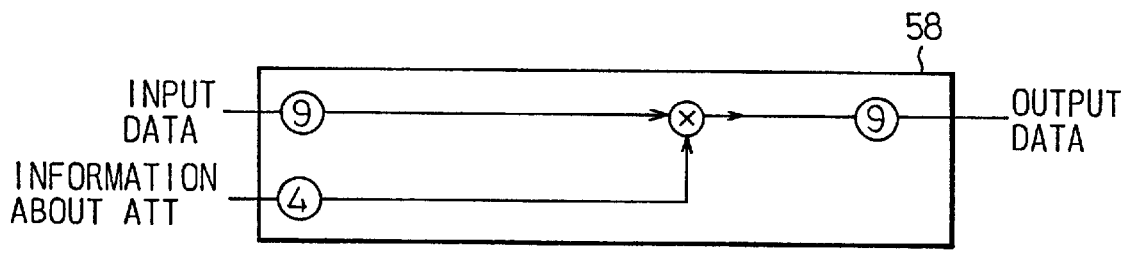
FIG. 12B is a diagram illustrating an ATT (attenuator) equalizing circuit according to a first embodiment of the present invention.
Figure 12C:
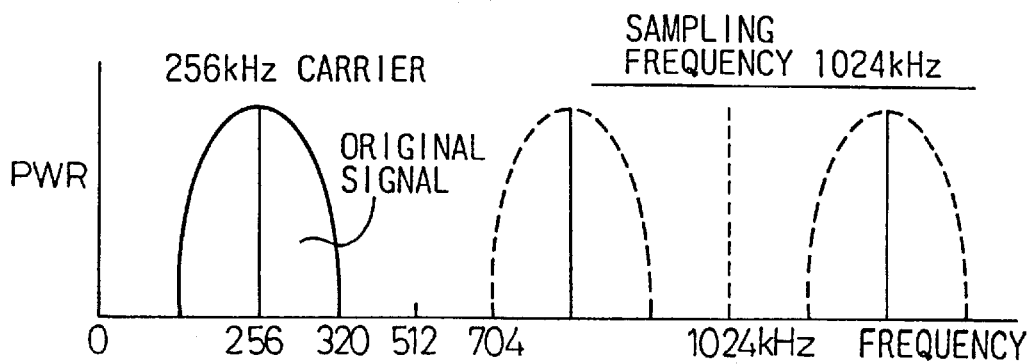
FIG. 12C is a diagram illustrating A/D (analog to digital) output spectra according to a first embodiment of the present invention.

FIGS. 12A, 12B and 12C are diagrams illustrating the modulating circuit 57, ATT equalizing circuit 58 and D/A output spectrum according to the first embodiment of the present invention, respectively.

FIG. 12A illustrates the modulating circuit 57. The modulating circuit is the one in the transmission unit and effects modulation on a carrier of 256 kHz.

Here, the input data includes outputs X, Y of FIG. 11B and eight (8) bit information x2=sixteen (16) bit information.

As mentioned above, the signal PH represents phase information during this period, since baud rate is 64 kHz for the sampling of 1024 kHz.

In FIG. 12A, COS+jSIN represents a carrier frequency. In the modem of this embodiment, the carrier frequency is 256 kHz, and the vector information assumes the shape of a single circle rotating at 256 kHz.

FIG. 12B illustrates an ATT equalizing circuit.

ATT is an attenuator in the transmission unit and works to adjust the level on the sending side.

Here, ATT information is used to determine the transmission level. In this embodiment, four (4) bit information is obtained in the form of sixteen (16) kinds of information by a unit of 1 dB over a range of 0 to 15 dB. On the other hand, a transmission ATT has about 2.5 bits at a range of 15 dB, a D/A error has about 1.0 bit at a range of 6 dB, a peak factor has about 2.0 bits at a range of 12 dB, a signal to noise ratio S/N in an EYE of 25% has about 2.0 bits at a range of 12 dB, and the transmission level has about 8.5 bits (=nine (9) bits) at a total range of 51 dB.

When the ATT equalizing circuit is realized by a circuit shown in FIG. 12B, input data of at least nine (9) bits is necessary. In this embodiment, however, an accuracy of D/A conversion is only eight (8) bits and, hence, the ATT circuit can be realized by analog hardware.

FIG. 12C illustrates D/A output spectra.

Figure 13:
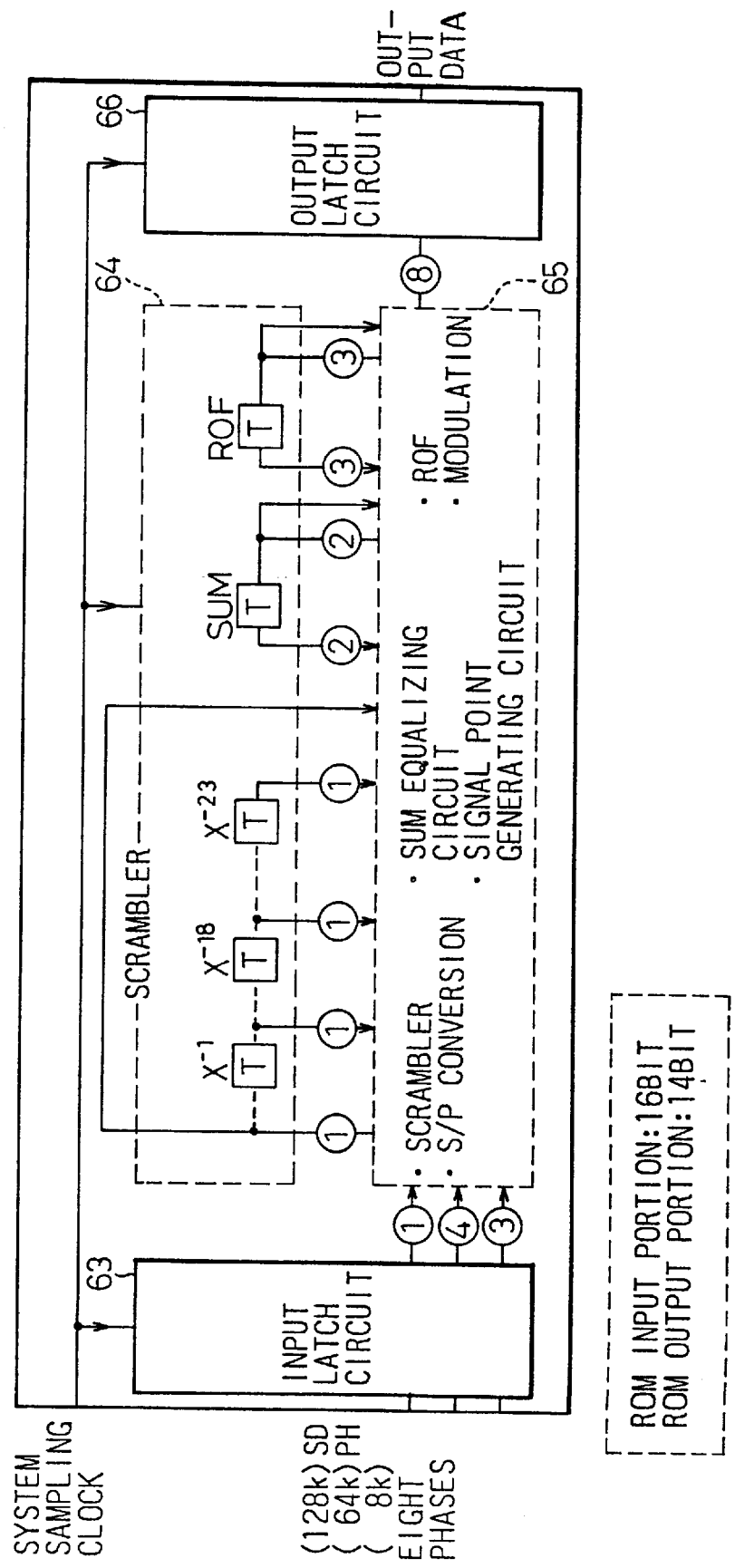
FIG. 13 is a block diagram illustrating a device made up of a scrambler and the like according to a first embodiment of the present invention.

FIG. 13 illustrates the case where the ROM substitutes for the circuit to which a variety of circuits according to the first embodiment of the present invention are connected.

In this embodiment, a scramble equalizing circuit, S/P converter, sum equalizing circuit, signal point generating circuit, ROF, 45-degree circuit, and modulating circuit are connected as the variety of circuits.

In the drawing, the reference numeral 64 denotes a register unit, and 65 denotes a ROM unit. The input latch circuit 63 and output latch circuit 66 are constituted by hardware.

In the ROM 65, the contents corresponding to the EOR circuit in scramble circuit, S/P conversion circuit, sum circuit, signal point generation circuit, filter coefficient of ROF, carrier frequency for modulation, and modulation function are all included.

As described above, the circuit shown in FIG. 13 demonstrates that even a circuit having detailed elements shown in FIGS. 6 to 12C, i.e., circuit having a plurality of functions or circuit constituted by connecting with each other a plurality of circuit portions having various functions, can be substituted by a circuit constituted by the register unit 64 and the ROM 65.

The ATT equalizing circuit has many bit data and is not suitable for obtaining relatively high S/N ratio, and is hence realized as separate hardware. This is because the separate hardware is small in the ATT equalizing circuit.

Moreover, a D/A conversion circuit and a PLL circuit are similarly realized as hardware. Here, the PLL circuit is a phase locked loop circuit. This circuit operates to synchronize with a system clock (128 kHz) input from an external unit.

The phase signal will not need a total bits of as much as seven (7) bits. Therefore, the total bits in the phase signal can be reduced by analyzing the amount of processing necessary over the whole time axis.

Figure 14A:
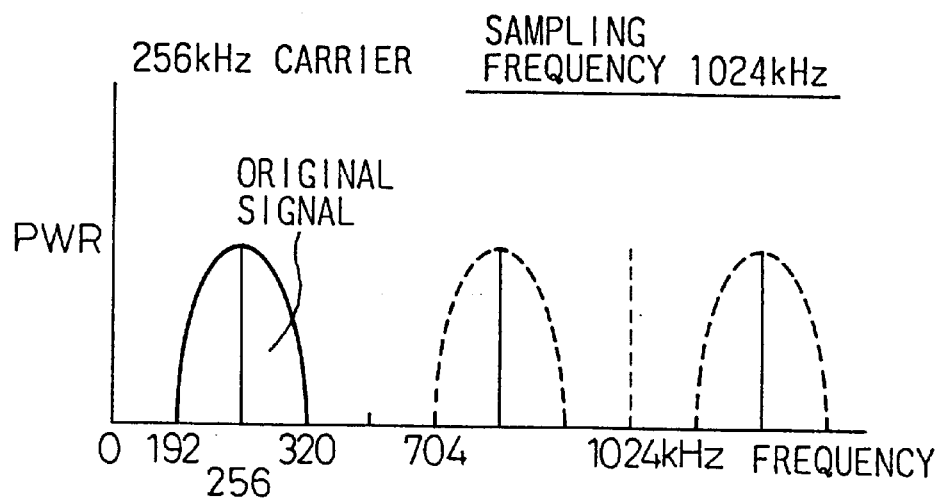
FIG. 14A is a diagram illustrating transmission spectra according to a first embodiment of the present invention.
Figure 14B:
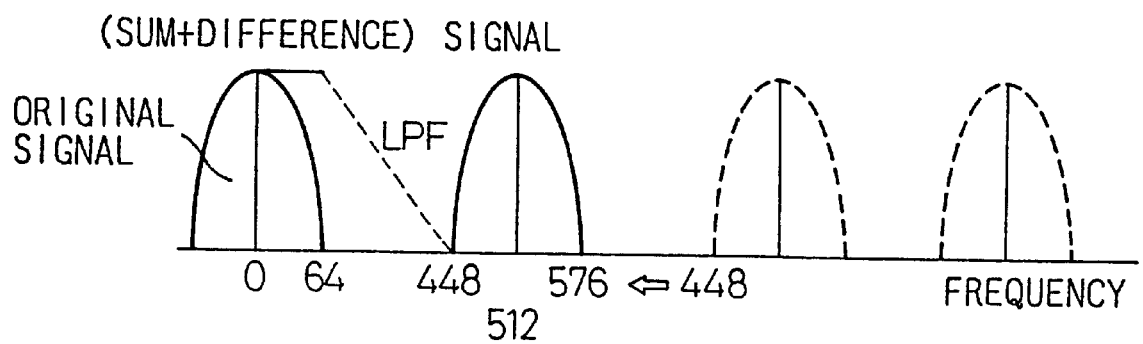
FIG. 14B is a diagram illustrating demodulated spectra according to a first embodiment of the present invention.

FIGS. 14A and 14B are diagrams illustrating transmission spectra and demodulated spectra according to the first embodiment of the present invention. In the transmission spectra of transmitted analog signals shown in FIG. 14A, a level of attenuation outside the band is 20.5 dB. In this case, a fourth order LPF (27.4 dB) is used.

FIG. 14B illustrates demodulated spectra in which transmission signals of FIG. 14A are demodulated by a carrier having a central frequency of 256 kHz.

After being demodulated, the signals are separated into sum signals (512 kHz) by the carrier of 256 kHz and base band signals of difference signals (0 kHz). The sum signals (512 kHz) are not necessary and are removed by an LPF.

In a four-value EYE pattern, a level of 15 dB forms a threshold in which a signal can be detected without error. From this view point, therefore, 20.5 dB is calculated by being lowered by about 6 dB from the threshold (an EYE opening factor is ¼=25%).

As for the LPF loss in the demodulated spectra shown in FIG. 14B, there will be no problem if 3×20 log (448/64)= 50.7 dB>24 dB. In this case, a second order LPF (33.8 dB) may be employed.

According to the second embodiment as described above, most equalizing circuits or at least one circuit made up of a connection of a variety of equalizing circuits can be replaced by ROM. Moreover, the above-mentioned embodiments are realized by pure hardware (ROM plus register unit) and can meet high speed operation requirements as far as the elements in the embodiment permit.

In particular, ROM/RAM memories are rapidly progressing and are fabricated in relatively large scales. By utilizing ROM/RAM, therefore, it is possible to realize an apparatus that meet every need of the occasion at a reasonable cost, that can be easily supplied, easily produced, simply constructed and yet operate at high speed.

Figure 15:
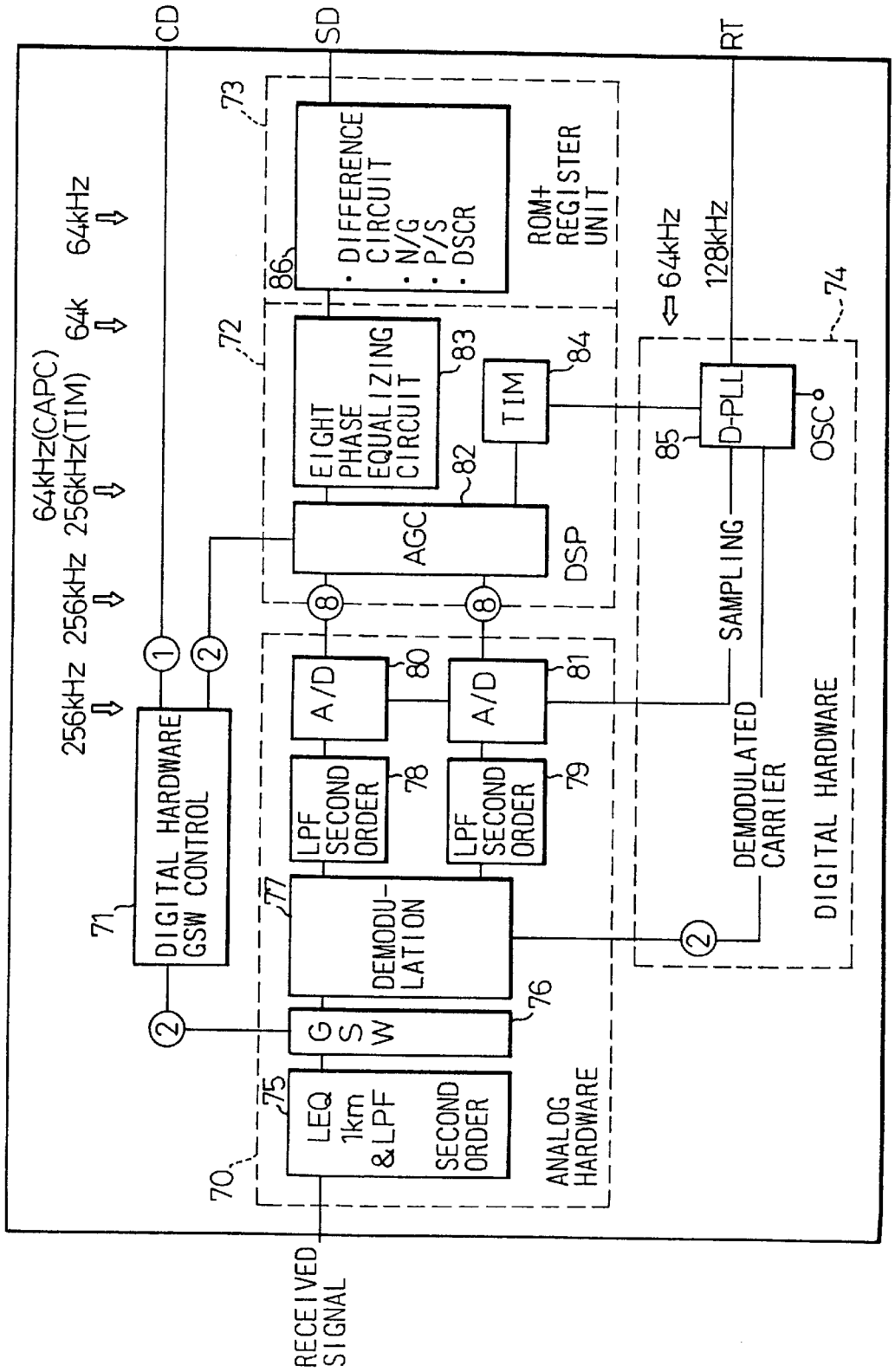
FIG. 15 is a block diagram illustrating a transmission unit according to a second embodiment of the present invention.

Next, FIG. 15 illustrates the receiving unit according to the second embodiment realizing the signal processing apparatus according to the second principle of the present invention.

The receiving unit includes an analog hardware unit 70 for processing analog signals, a digital hardware GSW control circuit 71 related to the external analog signals, A/D conversion units 80, 81 for converting analog signals into digital signals, a DSP (digital signal processor) 72 for processing digital signals, a digital hardware unit 74 for processing digital signals, and a ROM and a register unit 73.

Here, the embodiment of the present invention is not applied to either the analog hardware unit 70 or to the DSP 72.

As shown, the analog hardware unit 70 includes an LEQ circuit and an LPF circuit abbreviated to LEQ (line equalizer) & LPF 75, a GSW circuit 76, a demodulating circuit 77, and second order LPFs 78 and 79.

Here, the LEQ & LPF 75 is a line equalizer on the receiving side and has a performance equivalent to NLC 1 km as a fixing/equalizing function, since a target performance of the private modem has a criterion of NLC 2 km. Moreover, the LEQ & LPF 75 is realized based on the constitution of LPF to suppress external noise on the receiving side and to remove higher harmonics.

The GSW circuit 76 is a gain switch for reception. A lack in the number of bits in A/D conversion is compensated for by this circuit. The demodulating circuit 77 drops a pass band signal down to a base band signal.

The second order LPFs 78 and 79 work to remove noise outside the band for A/D conversion.

The DSP 72 includes an AGC (automatic gain control) circuit 82, an eight phase equalizing circuit 83, and a timing pick-up circuit 84 for picking up receiving timing to operate a D-PLL circuit 85 based upon lead/lag data of phases. Furthermore, the digital hardware unit 74 includes the D-PLL circuit 85.

The eight phase equalizing circuit 83 includes an eight-phase reversing circuit for reversely rotating eight phases executed on the sending side (i.e., shifting eight phases toward the reverse direction), a carrier automatic phase control circuit (CAPC), and a determination circuit for determining the received data.

The ROM & register unit 73 includes a difference circuit, an N/G conversion circuit, a P/S conversion circuit and a descramble circuit (DSCR) for obtaining the original transmission signals (these circuits are collectively designated by the reference numeral 86) by executing a process reverse to the process of the sum circuit executed on the sending side in order to remove a 90-degree phase shift which remains unchanged in the received data.

The N/G, P/S and descramble circuits execute a process reverse to the process effected on the sending side.

Described below is the whole operation of the receiving unit according to the second embodiment of the present invention.

The LEQ in the LEQ & LPF 75 equalizes a loss in the input signals caused through transmission over a metallic wire. Then, the LPF in the LEQ & LPF 75 removes undesired components outside the band. The GSW circuit 76 switches the gain of the input level corresponding to an optimum level. The signals are then demodulated into a real part and an imaginary part by a demodulation carrier (256 kHz).

Thereafter, undesired higher harmonics are removed by the LPFs of the second order 78 and 79. The signals are converted into digital signals through the A/D conversion units 80 and 81.

The thus converted digital signals are automatically controlled for gain by the AGC circuit 82, and the timing pick-up circuit 84 picks up lead/lag signals to control the D-PLL circuit 85 which forms sampling signals and a demodulated carrier, on the basis of a reception timing signal RT of 128 kHz.

Furthermore, the output (eight phase signal) of the AGC circuit 82 is returned back to the four phase signal, the phase of the carrier is controlled by the CAPC to obtain a result of determination of four values.

Thereafter, the signals are subjected to a phase differentiation, natural to gray conversion and parallel to serial conversion through the ROM & register unit 73. The signals are then descrambled through the DSP circuit (or descrambler) to obtain the original transmission data SD.

The GSW control circuit executes GSW control.

Here, 256 kHz represents the modulated carrier of the modem realized by this embodiment.

FIGS. 16A to 24 illustrate equalizing circuits of block diagrams of various functions.

Most of the equalizing circuits can be replaced by the system of the present invention. These equalizing circuits, however, are not suitable for processing data having a large number of bits. Therefore, each of the equalizing circuits is realized by separate hardware, provided that the scale of the hardware does not become very great.

Figure 16A:
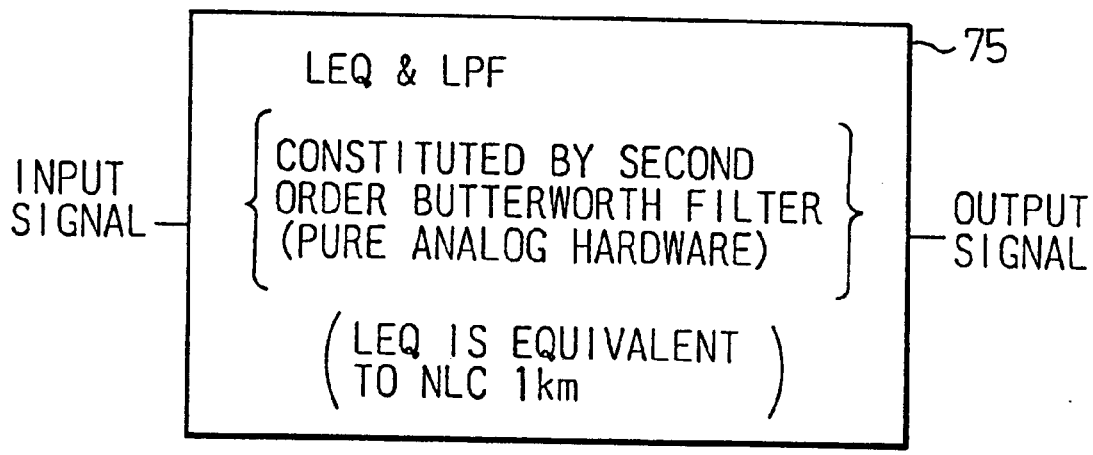
FIG. 16A is a diagram illustrating an LEQ (line equalizing) circuit and an LPF (low pass filter) circuit according to a second embodiment of the present invention.
Figure 16B:
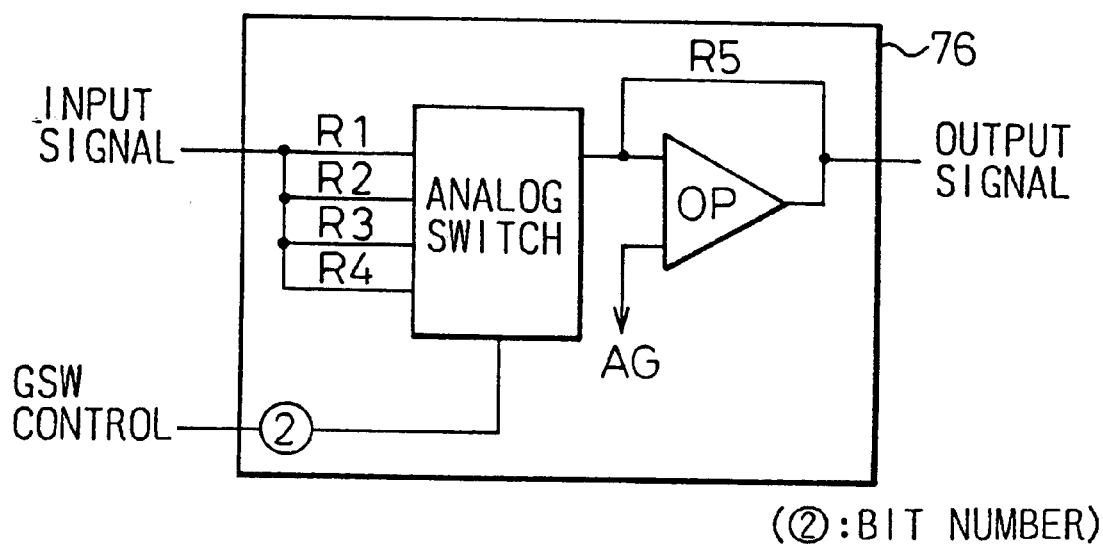
FIG. 16B is a diagram illustrating an analog GSW (gain switch) circuit according to a second embodiment of the present invention.

FIGS. 16A and 16B are diagrams illustrating the LFQ & LPF circuit and the analog GSW circuit according to the second embodiment of the present invention.

FIG. 16A illustrates the LEQ & LPF circuit 75 which includes a line equalizing circuit portion for reception and an LPE circuit portion for removing higher harmonics based upon a conventional analog technology.

These circuit portions are customarily employed ones.

The fixing/equalizing function corresponding to NLC 1 km is inserted, since a target performance of the private modem has a criterion of NLC 2 km.

This is further realized in the constitution of the second order LPFs in order to suppress external noise on the receiving side.

FIG. 16B illustrates the analog GSW circuit 76 which is a gain switch for reception, wherein R1 to R5 denote resistors and OP denotes an operational amplifier.

This may be a customarily employed one.

This circuit compensates for a lack in the number of bits in an A/D conversion circuit.

Figure 17A:
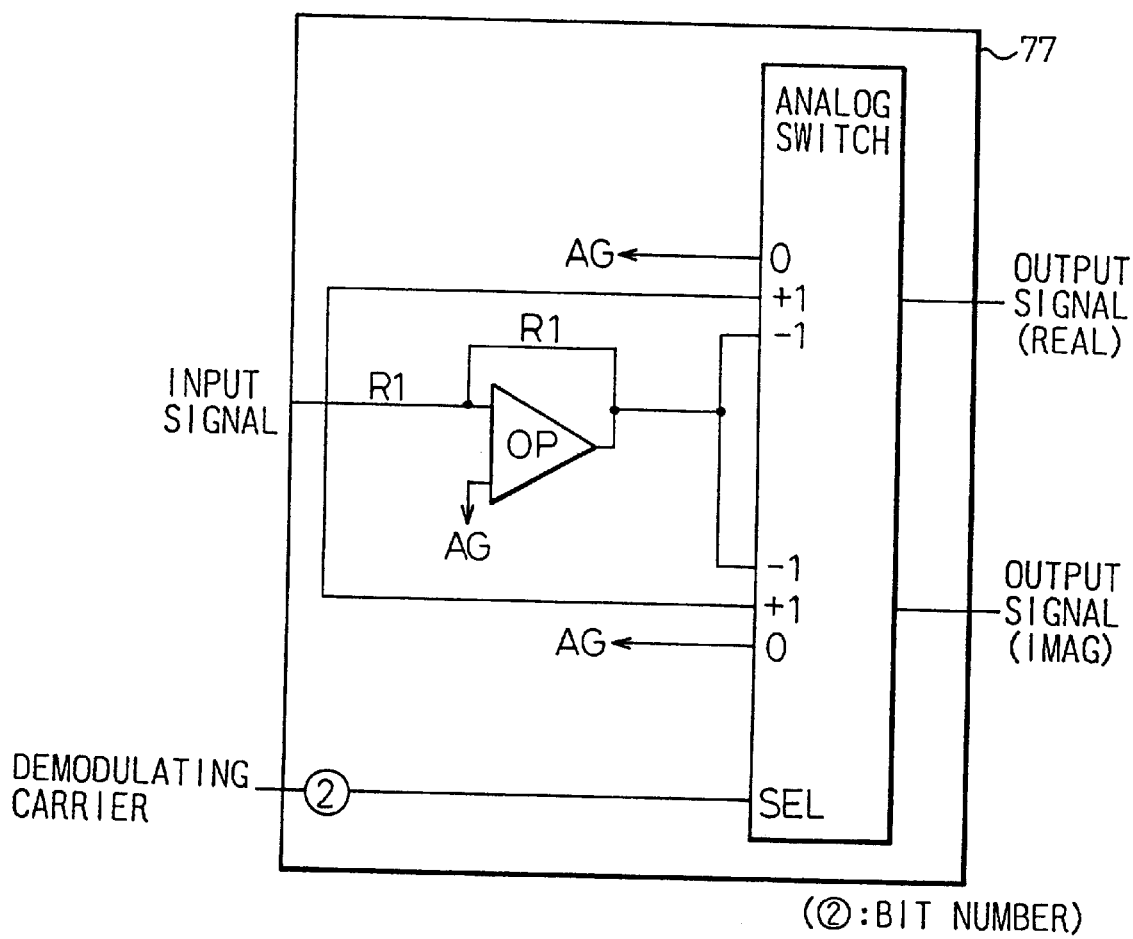
FIG. 17A is a diagram illustrating an analog demodulating circuit according to a second embodiment of the present invention.
Figure 17B:
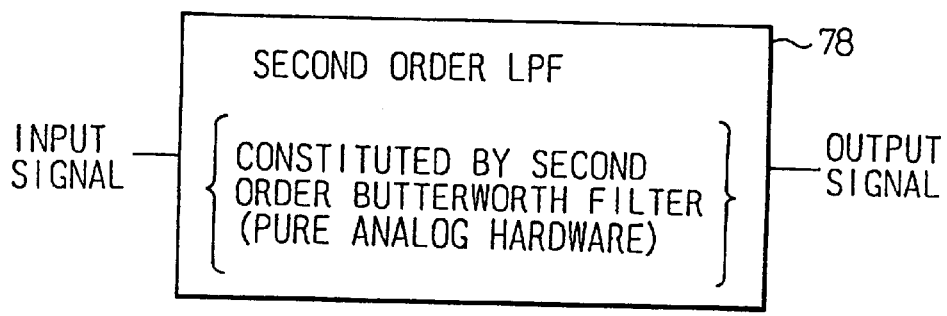
FIG. 17B is a diagram illustrating a second order LPF circuit according to a second embodiment of the present invention.

FIGS. 17A and 17B are diagrams illustrating the analog demodulating circuit and the second order LPF circuit according to the second embodiment of the present invention.

FIG. 17A illustrates an analog demodulating circuit 77 for reception, and FIG. 17B illustrates a second order LPF circuit 78 for reception.

This demodulating circuit drops the pass band signal to the base band signal.

The LPF circuit removes noise outside the band for A/D conversion.

Figure 18:
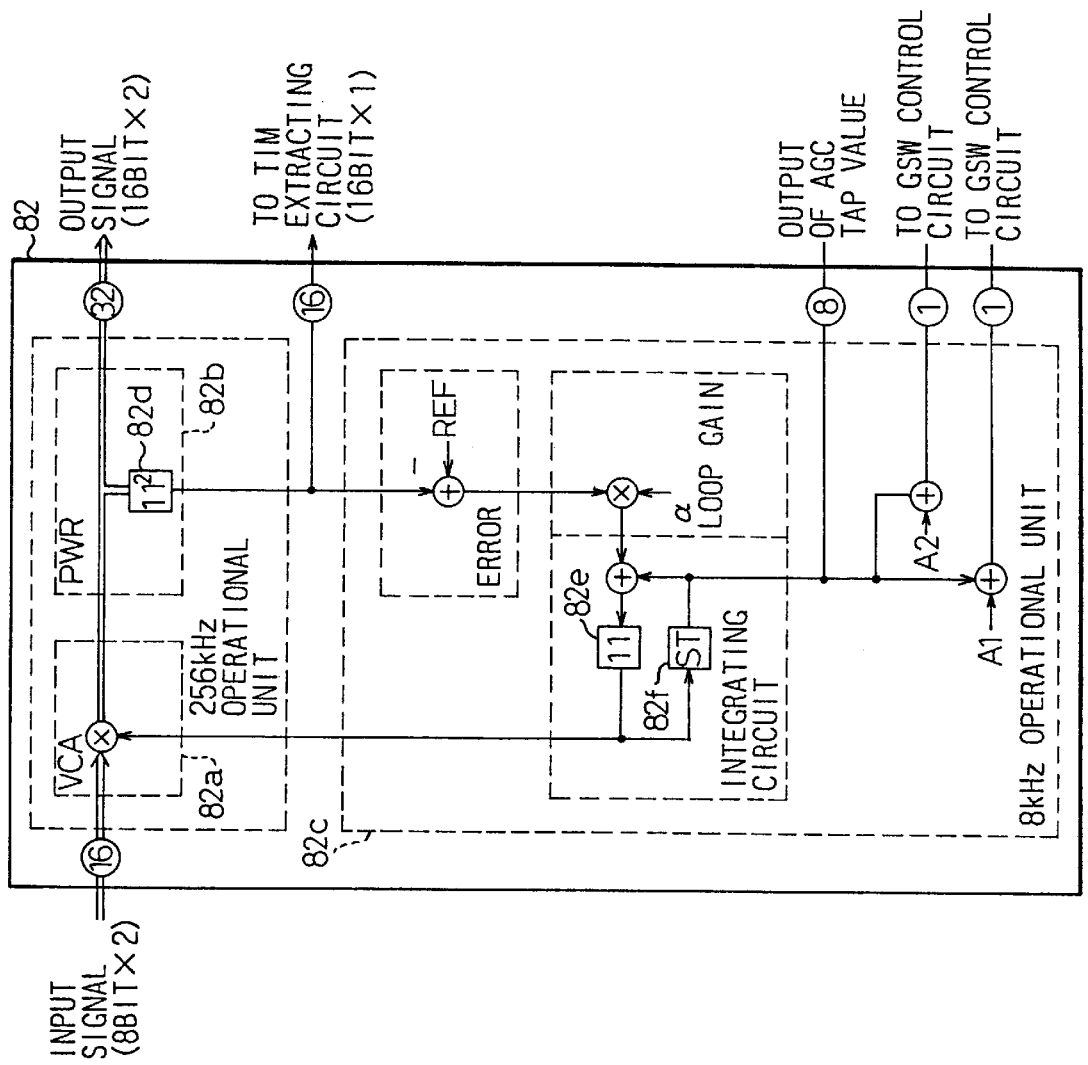
FIG. 18 is a block diagram illustrating an AGC (automatic gain control) equalizing circuit according to a second embodiment of the present invention.

FIG. 18 is a diagram illustrating an AGC (automatic gain control) equalizing circuit 82 according to the second embodiment of the present invention provided in the above-mentioned DSP 72.

Here, VCA 82a represents a voltage-controlled amplifier, PWR 82b denotes a power unit, and 82c denotes an 8 kHz operational unit. Reference numeral 82d denotes a squaring circuit, 82e denotes an absolute value circuit, and 82f denotes an eight symbol delay circuit.

Figure 19A:
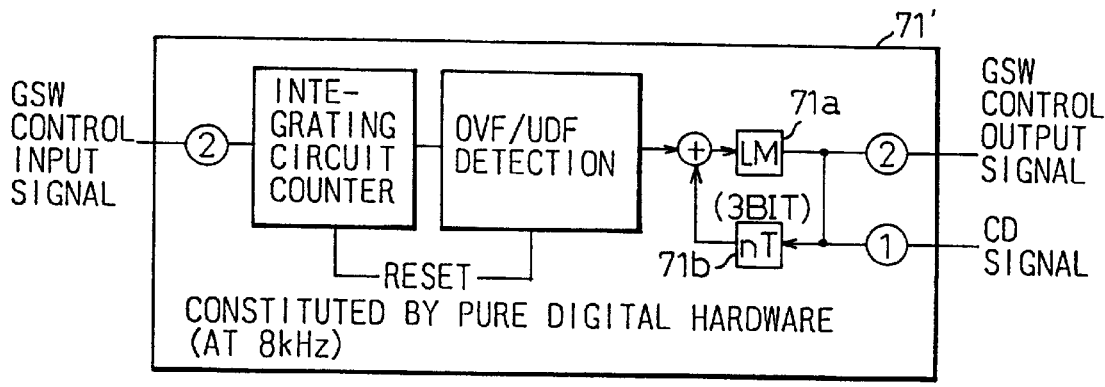
FIG. 19A is a diagram illustrating the constitution of a GSW control circuit according to a second embodiment of the present invention.
Figure 19B:
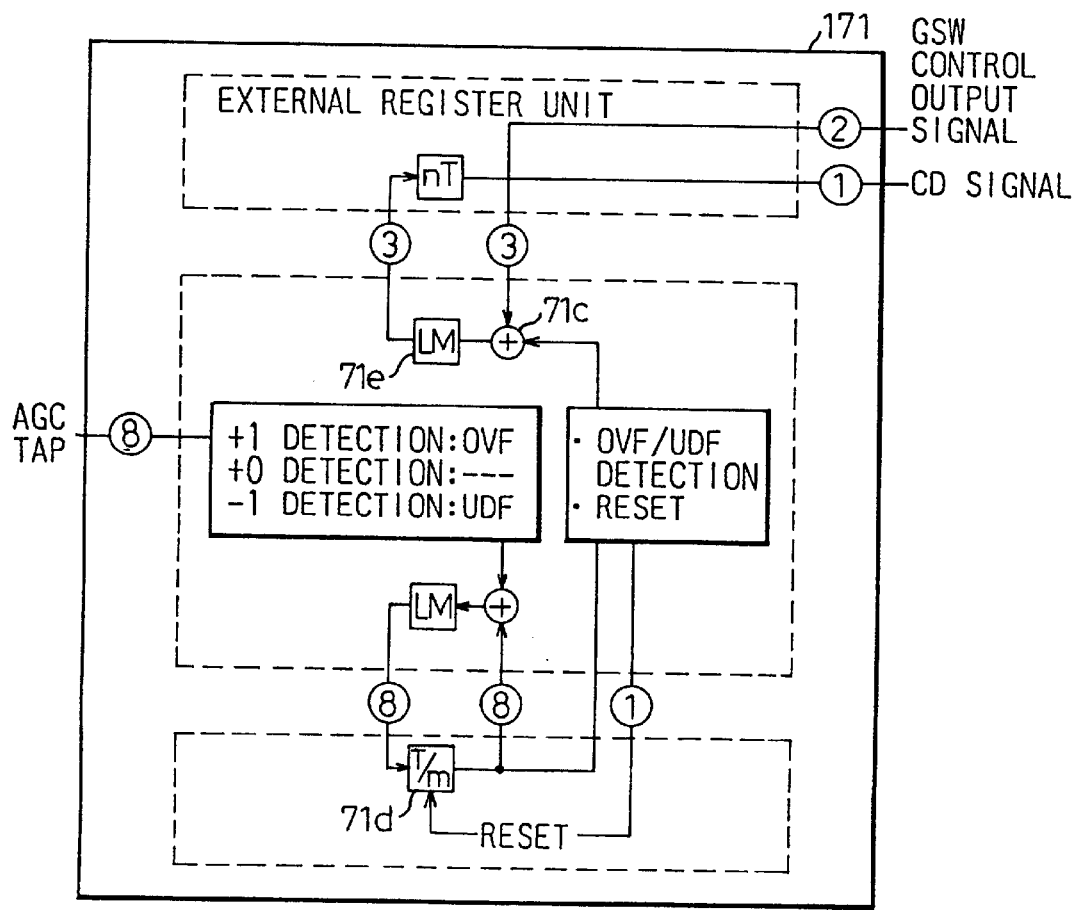
FIG. 19B is a diagram illustrating another constitution of a GSW control circuit according to a second embodiment of the present invention.
Figure 20:
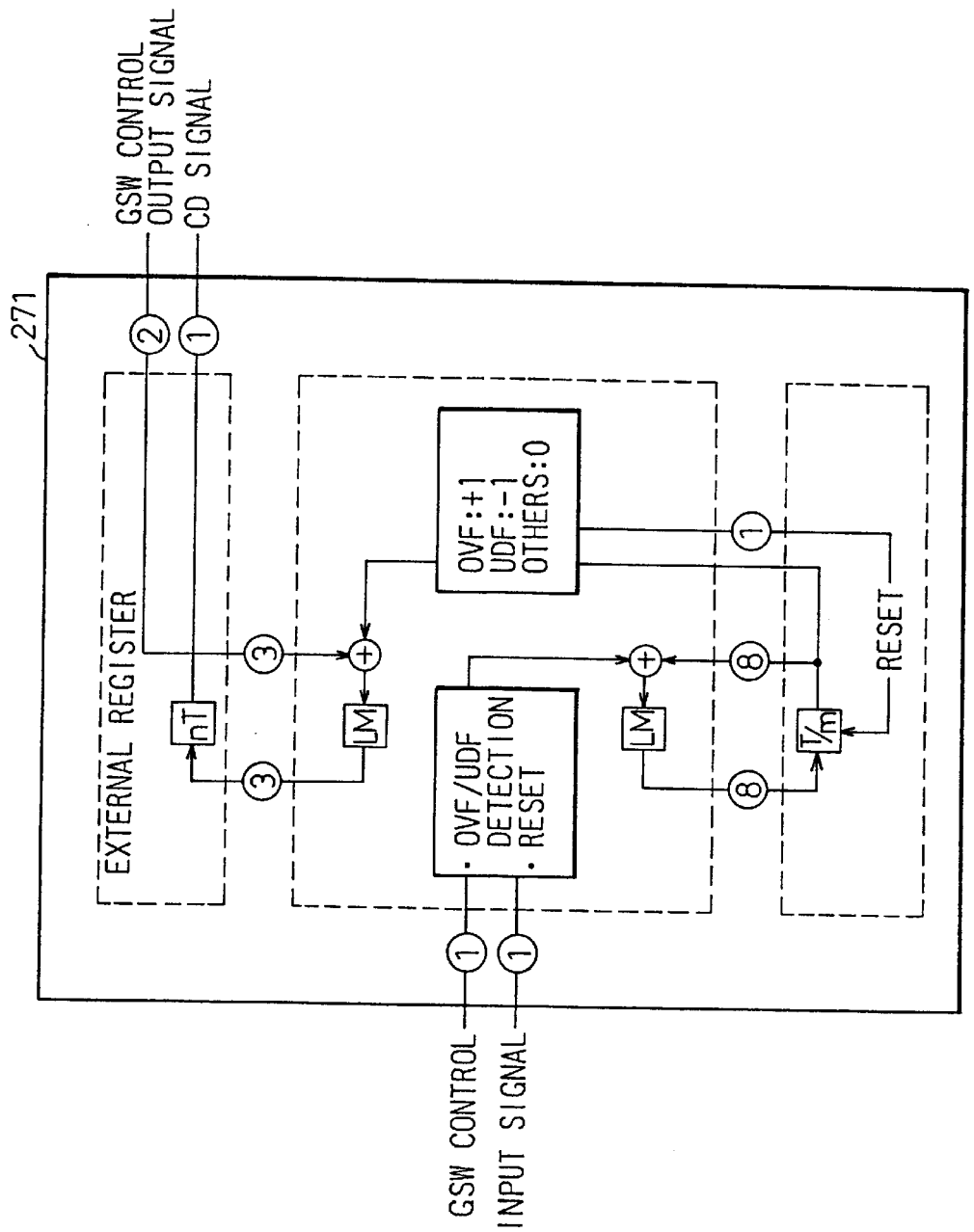
FIG. 20 is a diagram illustrating a further constitution of a GSW control circuit according to a second embodiment of the present invention.

FIGS. 19A, 19B and 20 are diagrams illustrating the GSW control circuit 71' corresponding to the digital hardware GSW control circuit 71 constituted by digital hardware according to the second embodiment of the present invention. The GSW control circuit 71' operates to control the above-mentioned GSW circuit for reception.

FIG. 19A illustrates the GSW control circuit realized purely by digital hardware. FIGS. 19B and 20 illustrate GSW control circuits 171 and 271 according to embodiments different from that of FIG. 19A, wherein the circuit of FIG. 19B includes an external register unit and the DSP controlled by an AGC tap, and the circuit of FIG. 20 includes the external register unit and the DSP controlled by a GSW-controlled input signal.

In these drawings, reference numeral 71a denotes a limiter circuit, 71b denotes an n-symbol (n: arbitrary integer) delay circuit, 71c denotes an adder circuit, and 71d denotes a T/m delay circuit.

Figure 21A:
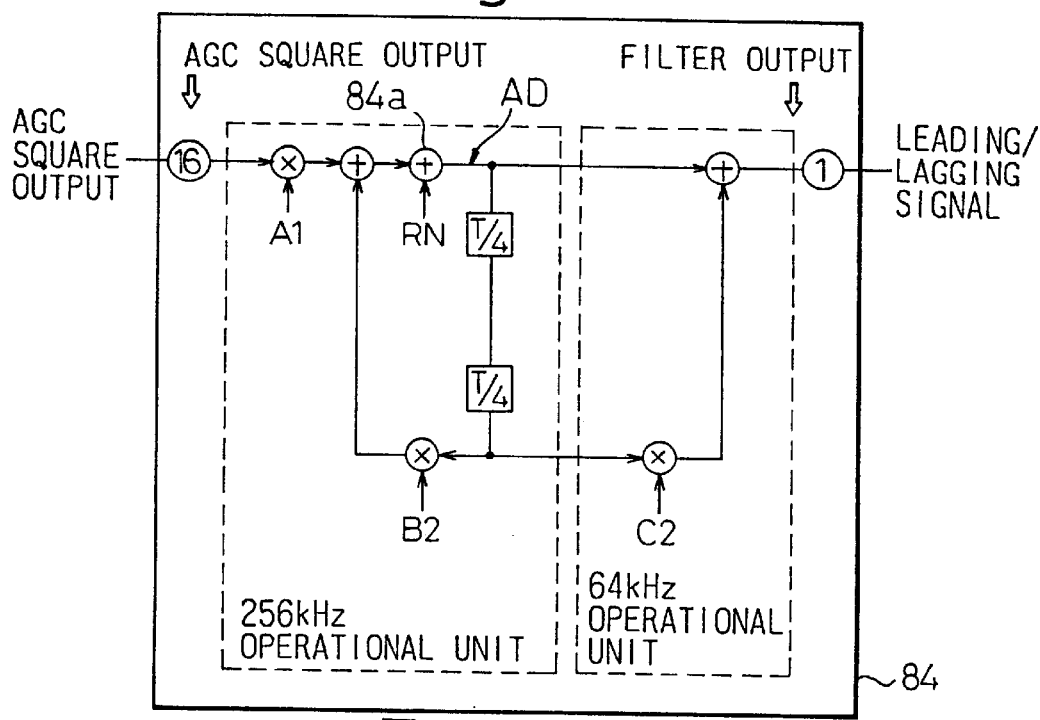
FIG. 21A is a diagram illustrating the original constitution of a timing pick-up equalizing circuit to which a second embodiment of the present invention is applied.
Figure 21B:
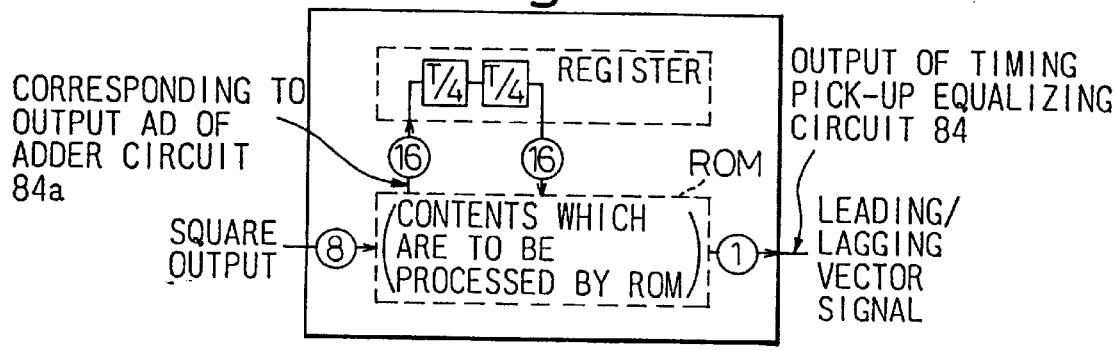
FIG. 21B is a diagram illustrating a timing pick-up equalizing circuit according to a second embodiment of the present invention.
Figure 21C:
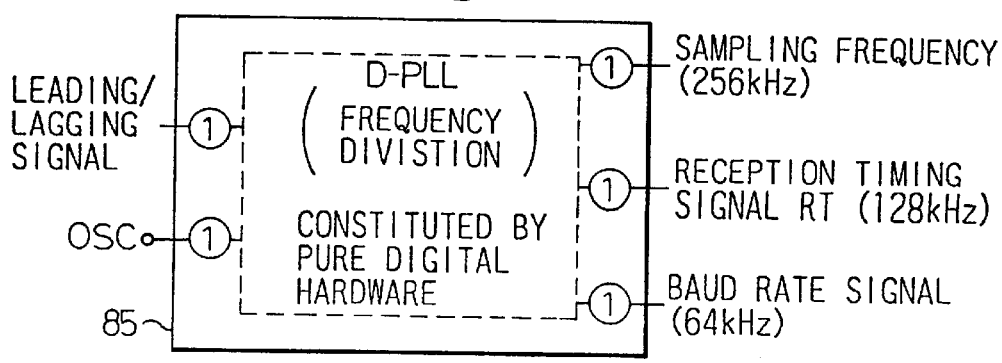
FIG. 21C is a diagram illustrating a D-PLL circuit according to a second embodiment of the present invention.

FIGS. 21A, 21B and 21C are diagrams illustrating a timing (TIM) pick-up equalizing circuit and a D-PLL circuit according to the second embodiment of the present invention.

FIG. 21A illustrates a timing pick-up equalizing circuit 84 for picking up received timing signals. If this circuit is substituted by a ROM, the number of bits of an input signal to the ROM becomes twenty-four (8+16 =24) as shown in FIG. 21B. More specifically, a square output of eight bits and a sum output AD of an adder circuit 84a (shown in FIG. 21A) of sixteen bits are collectively input to the ROM. The number of bits of the input signal exceeds the maximum number of bits that can be used for designating the address signal to the ROM. Therefore, the number of bits of the ROM is increased relying upon the above-mentioned third principle of the present invention (see FIG. 4), or the timing pick-up equalizing circuit is not replaced by the ROM.

FIG. 21C denotes the D-PLL circuit (digital phase locked loop control circuit) realized by pure digital hardware.

Figure 22:
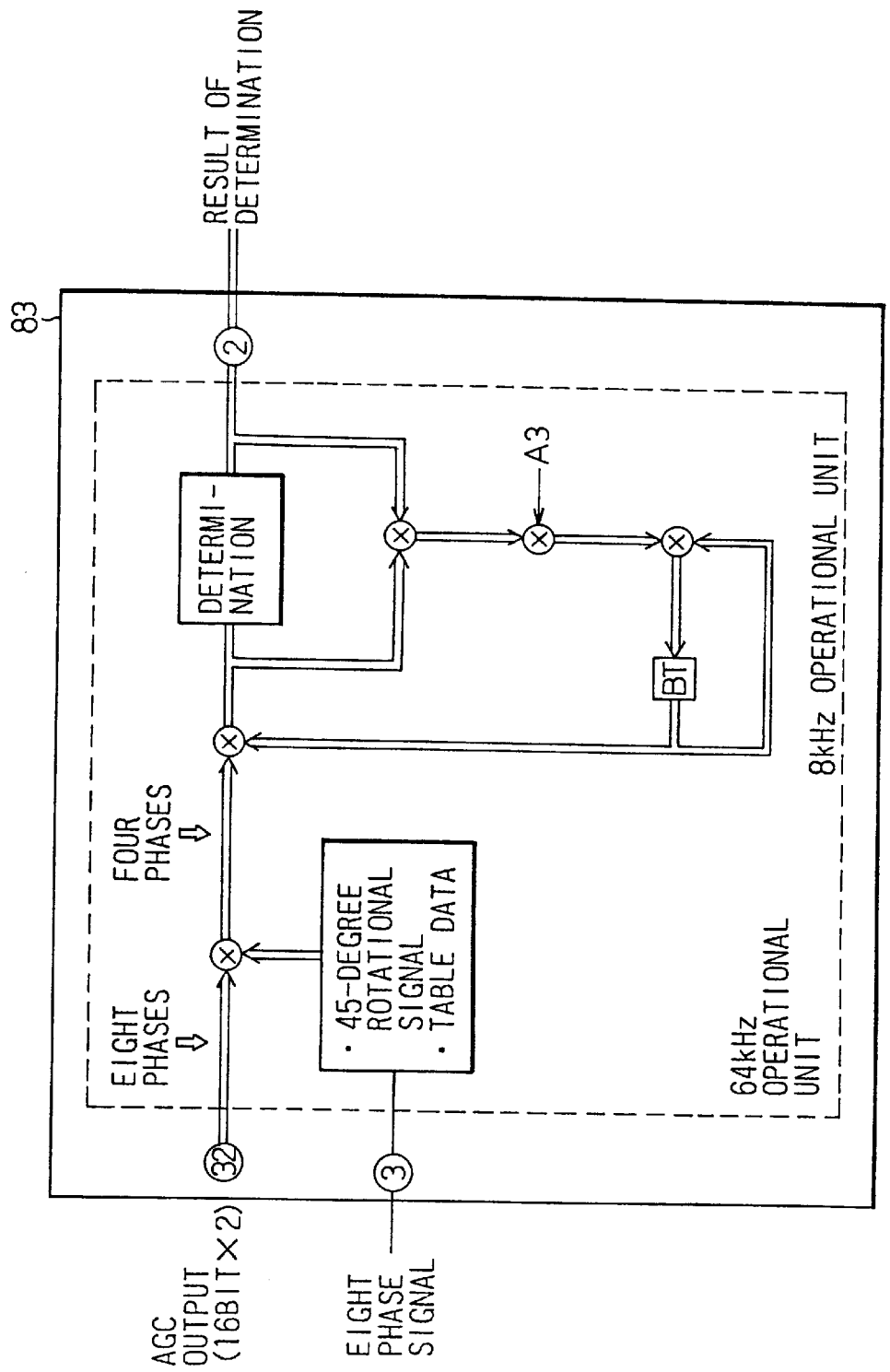
FIG. 22 is a block diagram illustrating a circuit for reversely rotating eight phases according to a second embodiment of the present invention.

FIG. 22 is a diagram illustrating an eight phase reversing circuit constituting the eight phase equalizing circuit 83 according to a third embodiment, a CAPC circuit and a determination circuit. In this apparatus, the number of bits is as large as thirty-five (3+32 =35), and the circuit is not replaced by ROM.

Figure 23A:
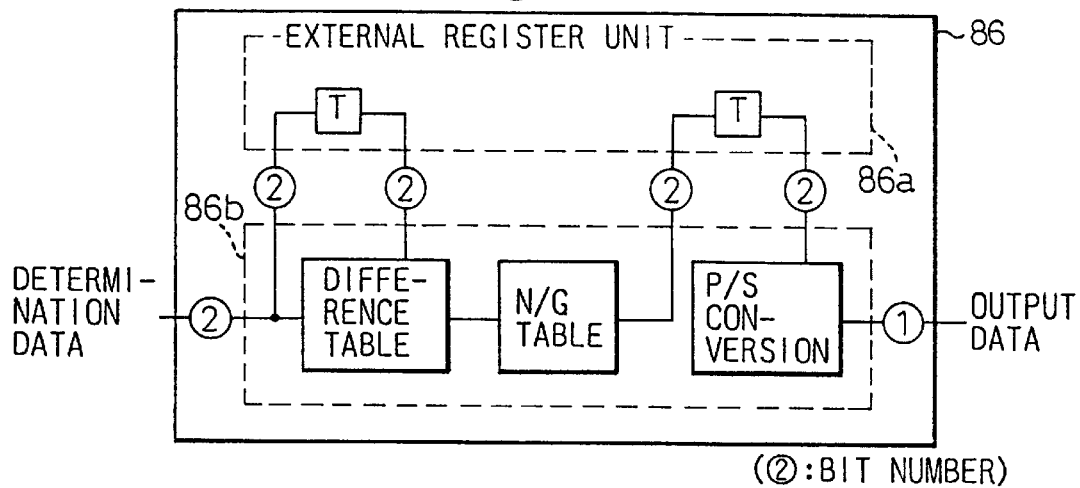
FIG. 23A is a diagram illustrating the original of an equalizing circuit made up of a differential circuit, an N/G (natural to gray) conversion circuit and a P/S (parallel to serial) conversion circuit to which a third embodiment of the present invention is applied.
Figure 23B:
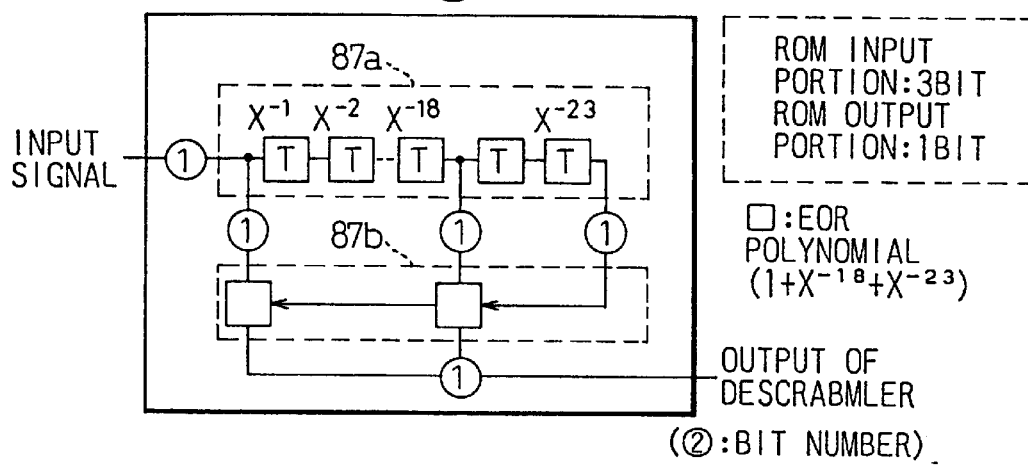
FIG. 23B is a diagram illustrating the original constitution of a descramble equalizing circuit to which a third embodiment of the present invention is applied.
Figure 23C:
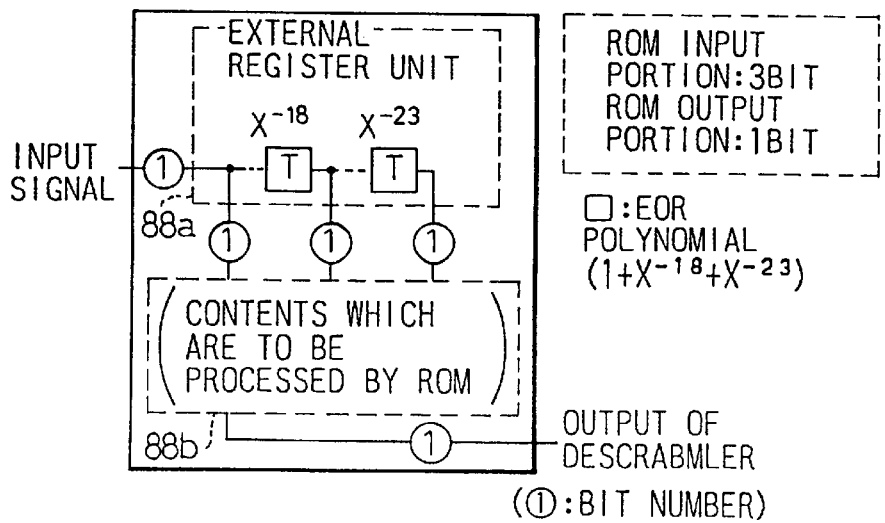
FIG. 23C is a diagram illustrating an example where a third embodiment of the present invention is applied to major circuit portions of FIGS. 23A and 23B.

FIGS. 23A, 23B and 23C are diagrams illustrating a difference circuit, an N/G conversion circuit, an equalizing circuit of a P/S conversion circuit and a descramble equalizing circuit according to the second embodiment of the present invention.

FIG. 23A illustrates an equalizing circuit synthesized by the differential circuit, N/G conversion circuit and the P/S conversion circuit, that is to be replaced by this embodiment, wherein reference numeral 86a denotes a portion to be replaced by the register portion, and 86b denotes a portion to be replaced by the ROM.

FIG. 23B illustrates the descramble equalizing circuit which is to be replaced by this embodiment. In FIG. 23C, the circuit portions 87a and 87b shown in FIG. 23B are replaced by the register unit 88a and the ROM 88b.

Figure 24:
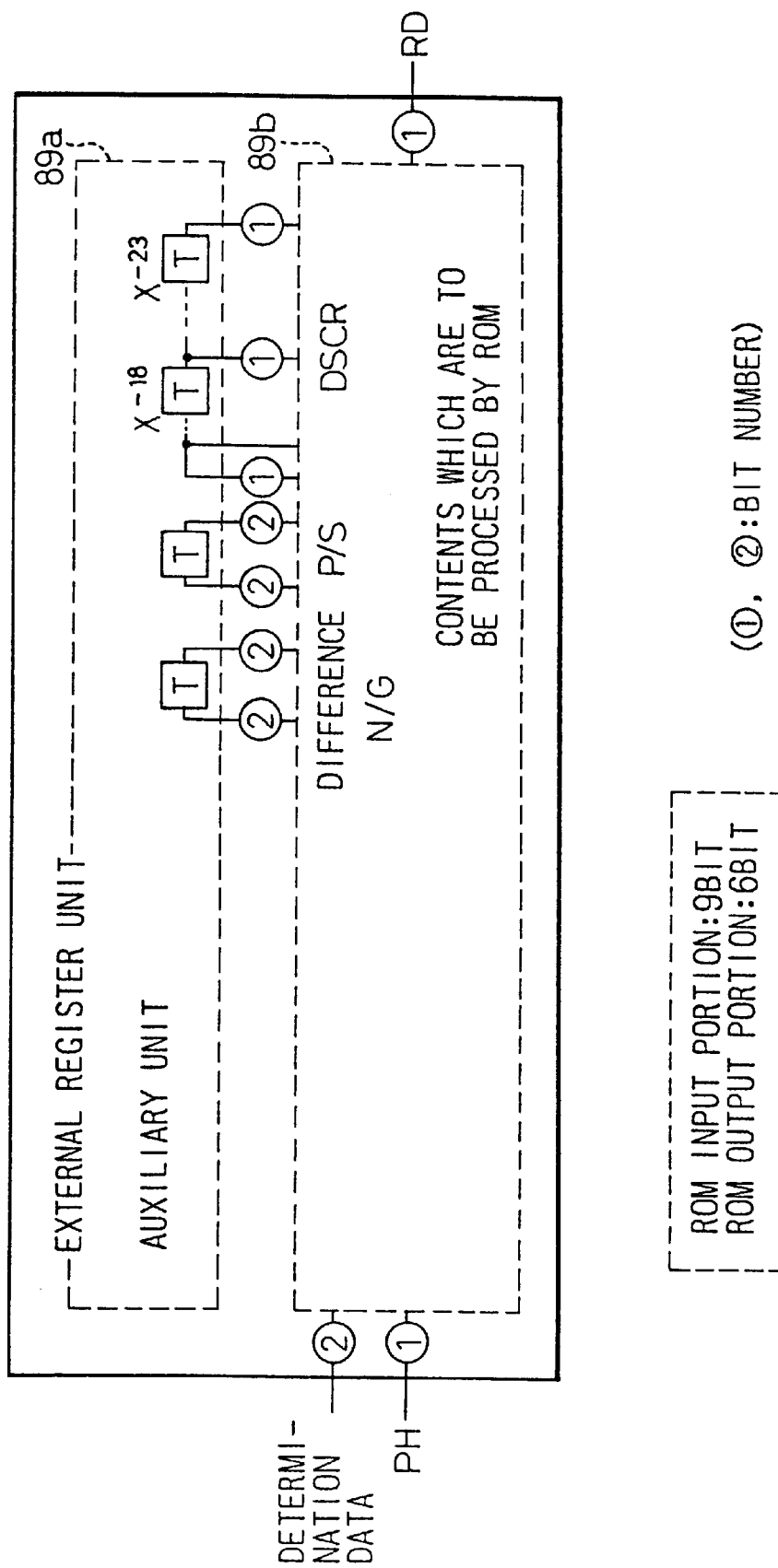
FIG. 24 is a diagram illustrating the contents which are to be processed by a ROM according to a second embodiment of the present invention.

FIG. 24 illustrates a case in which a circuit consisting of the difference circuit, N/G conversion circuit, P/S conversion circuit and descramble equalizing circuit according to the third embodiment is replaced by the external register unit 89a and the ROM 89b.

According to the second embodiment of the present invention as described above, most equalizing circuits or a circuit made up of a connection of a variety of equalizing circuits can be replaced by the ROM. Moreover, since the above-mentioned embodiment is realized purely by hardware (ROM plus register portion), the processing speed can be increased to as much as the elements permit.

In particular, ROM/RAM memories are rapidly progressing and are fabricated in relatively large scales. By utilizing ROM/RAM, therefore, it is possible to realize an apparatus that meet every need of the occasion at the reasonable cost, that can be easily supplied, easily produced, simply constructed and yet operates at high speed.

Next, the signal processing apparatus according to a fourth principle of the present invention will be described with reference to a fourth embodiment in conjunction with FIGS. 25 and 26.

Figure 25:
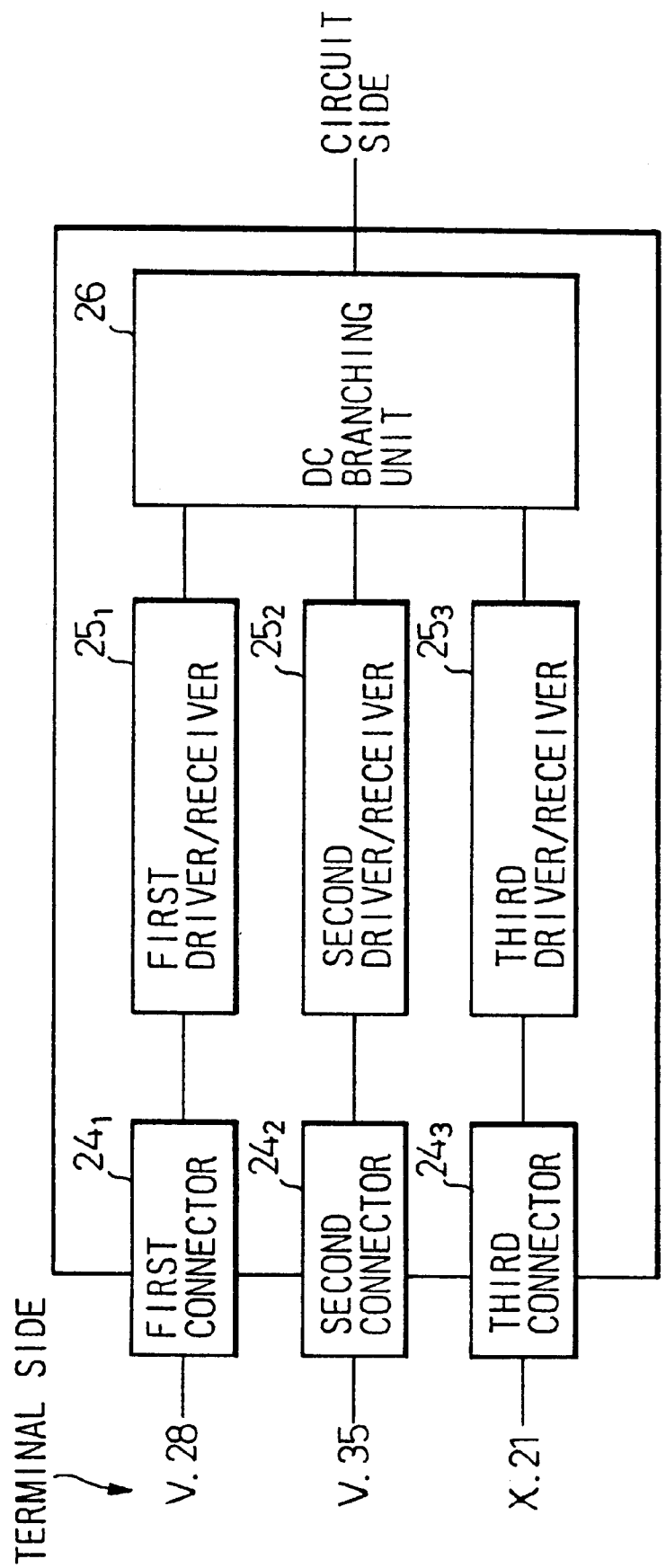
FIG. 25 is a diagram illustrating an apparatus including a terminal interface according to a fourth embodiment of the present invention.

FIG. 25 is a diagram illustrating an apparatus including a terminal interface according to the fourth embodiment of the present invention.

The terminal interface (DTE-DCE interface) which is a signal processing apparatus according to the fourth embodiment of the present invention has, as shown in FIG. 25, connectors $24_1$, to $24_3$ of a number equal to a plurality of channels (three channels here) connected to plural kinds of terminal equipment that operates under different interface conditions, level conversion units (drivers/receivers) $25_1$ to $25_3$ of a number equal to the plurality of channels, which are connected to the connectors $24_1$ to $24_3$ to convert levels of transmission and reception signals, and a DC branching unit 26 having a DC branching function for the plurality of channels, and controls the connection between the data terminal equipment (DTE) and the circuit end equipment (DCE) such as a modem or the like.

Figure 26:
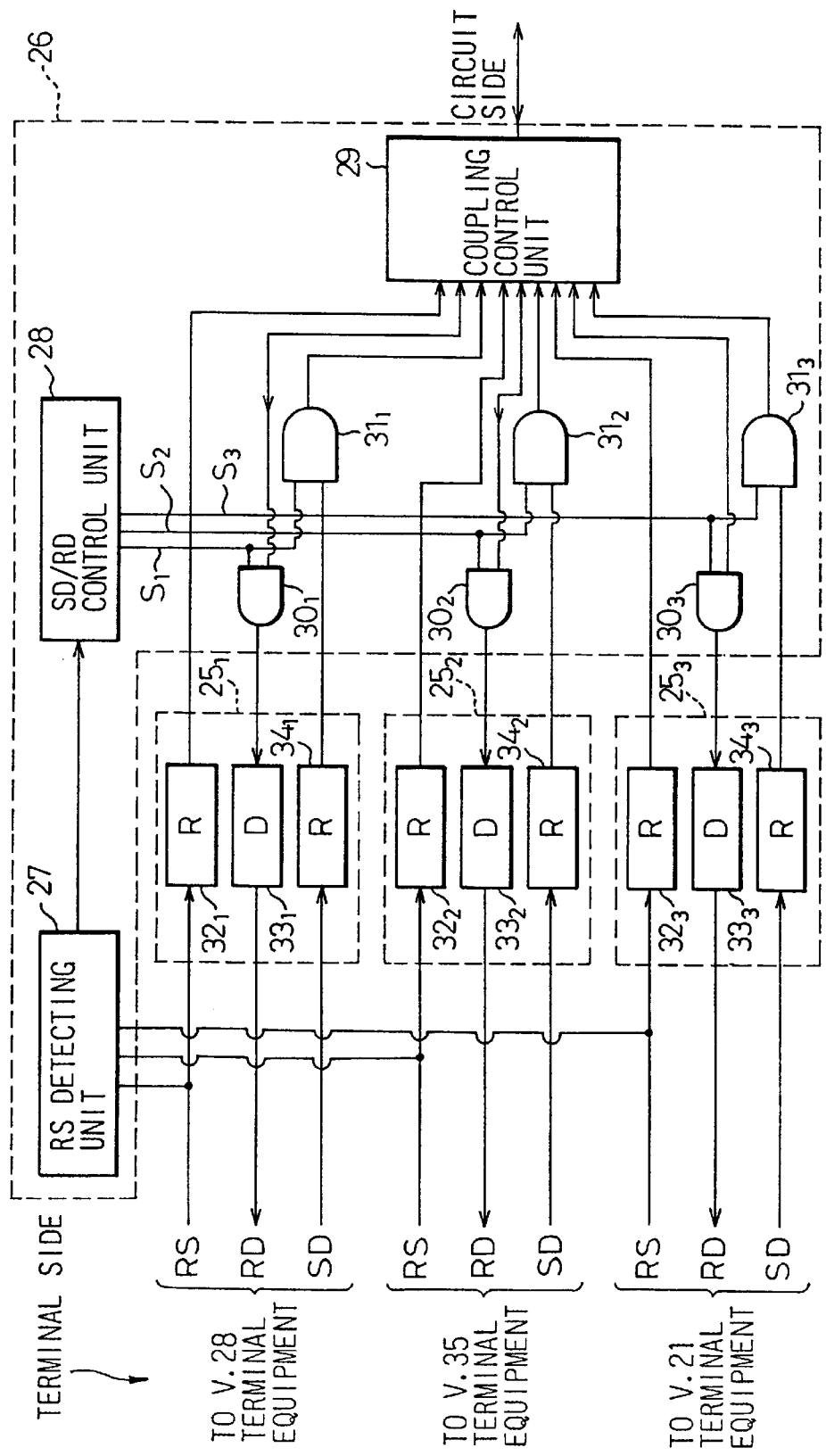
FIG. 26 is a diagram illustrating the constitution of a major portion of FIG. 25.

FIG. 26 illustrates in detail major portions of the signal processing apparatus of FIG. 25.

The level conversion units $25_1$ to $25_3$ of FIG. 25 have receivers $32_1$ to $32_3$, 34 to $34_3$ and drivers $33_1$ to $33_3$.

Here, each of RS signals (abbreviated to RS in FIG. 26) is a signal for requesting transmission from the terminal equipment. This RS signal is necessarily turned on when the terminal equipment transmits signals. Each RD signal is a signal representing received data and each SD signal (i.e. transmission data SD as mentioned before) is a signal representing transmitted data.

As shown, the DC branching unit 26 includes an RS detecting unit 27 which monitors RS signals, detects RS signals that are turned on, and, when even one of the RS signals are turned on, sends a signal to an SD/RD control unit 28 while attaching thereto the address of a terminal that has turned the corresponding RS signal on. Further, the RS signal detecting unit 27 can discriminate which terminal equipment outputs the RS signals. The DC branching unit 26 also includes the SD/RD control unit 28 which, based on a result of detection of the RS detecting unit 27, keeps the terminal equipment that has turned the RS signal on in a state where the gate thereof is opened but keeps the gates of other terminal equipment closed, so that the signals are no longer transmitted or received. The DC branching unit 26 also includes a coupling control unit 29 which controls coupling between the interface and the AND elements $30_1$ to $30_3$ that are opened and closed by the SD/RD control unit 28.

Here, the coupling of the interface is controlled by the coupling control unit 29 in a manner as described below.

(1) RS signals from V.28 terminal equipment, V.35 terminal equipment and X.21 terminal equipment are offered to the data circuit side through the logic OR circuit. Or, a priority is controlled for the RS signals, and a port that has produced the RS signal first is preferentially connected to the data circuit side.

(2) The RD signals from the circuit side are directly offered to the ports of the V.28 terminal equipment, V.35 terminal equipment and X.21 terminal equipment.

(3) The SD signals from the V.28 terminal equipment, V.35 terminal equipment and X.21 terminal equipment are offered to the data circuit side in compliance with the contents described in the item (1).

According to this embodiment, the RS detecting unit 27 monitors the RS signals and discriminates which terminal equipment outputs the RS signals. When even one of the RS signals is turned on, the RS detecting unit 27 sends to the SD/RD control unit 28 the address of a terminal that has turned the RS signal on. The control unit then outputs a gate selection signal. When, for instance, the V.28 terminal equipment turns the RS signal on, the control unit produces an output S1 which is "1" and produces outputs S2 and S3 which are "0", thereby to open the gates $30_1$ and $31_1$ and to close the gates $30_2$, $30_3$, $31_2$, $31_3$. Therefore, the SD and RD lines of terminal equipment are suppressed to the level "1" except for those of the V.28 terminal equipment that has turned the RS signal on, and the communication is not effected. The SD line only may be suppressed to the level "1".

According to the fourth embodiment of the present invention as will be obvious from the foregoing description, signals of other terminal equipment operating under different interface conditions are not sent onto the circuits connected to a center and the like, or data are not undesirably sent to other terminals. Besides, signals are not interfered by each other among terminal equipment, and a defect in a terminal equipment does not adversely affect other terminal equipment.

Though the foregoing embodiment has dealt with direct branching concerning three kinds of terminal equipment, it should be noted that terminal equipment are not limited to three kinds only. Terminal equipment of the same kind may exist, as well.

According to the first, second and third embodiments of the present invention as described above, it is possible to greatly reduce the cost of a system (which is not limited to the field of data transmission only) which executes a complex process yet requiring a reduced number of bits in the input signals and a reduced number of bits for the register that is essentially required by reducing the amount for signal processing and the number of parts, to greatly improve the quality of the apparatus accompanying the reduction in the number of electric components, and to cheaply increase the signal processing functions without decreasing the processing speed.

According to the fourth embodiment of the present invention, furthermore, it is possible to connect the data terminal equipment in compliance with a plurality of different interface conditions to a shared circuited without using switch. Accordingly, there is no need to develop a plurality of related devices. Besides, since the DC branch function can be obtained in the form of an LSI, the apparatus can be realized in a small size and at a reduced cost.

Concretely speaking, the following effects are brought about.

(1) High speed transmission in a private system.

The data can be transmitted at high speed within a narrow band by using metallic wires instead of using an expensive optical fiber cable.

Therefore, the cost for installation is not so high and the installation can be easily changed.

Moreover, since the band is narrow, the distance of connection can be greatly increased (from 300 meters to a maximum of 6 km (with a diameter of 0.9 mm)) compared with metallic wires of a conventional base band system.

(2) High speed data transmission apparatus for CATV network.

The data can be transmitted at high speed within a narrow band by using a cheap coaxial cable instead of using an expensive optical fiber cable.

Therefore, the installation cost is not so high, and the number of channels can be increased owing to narrow-band transmission.

(3) Application to digital VTR.

A digital VTR pertains to a field where the data must be processed at high speed using a high-density recording apparatus. By applying the present invention to this field of art, an apparatus can be cheaply realized.

By employing the embodiments of the present invention, furthermore, the latest systems can be realized featuring high speed operation in compliance with not only PSK system but also V.34 (V. fast) which recently has been discussed and approved by ITU-T beyond the limit of DSP.

Though this specification has described the constitution and features of the present invention with reference to the case where the signal processing apparatus of the invention is used for a modem, it should be noted that the signal processing apparatus of the present invention can be further applied to magnetic disk devices and household VTRs.

If described in further detail, signals modified by a modulating circuit are input to a recording medium such as a magnetic disk or a video tape. Moreover, signals formed by superposing data signals on the modulated signals are output from the magnetic disk or the video tape. The thus output signals are demodulated by a demodulating circuit, and the data signals are picked up at high speed.

That is, even in each magnetic disk device in which a magnetic disk is used as a recording medium or in each household VTR in which a video tape is used as a recording medium, the signals are modulated and demodulated at high speed as in the modem. Accordingly, the signal processing apparatus of the present invention can be very effectively applied even to magnetic disk devices and to household VTRs.

What is claimed is:

1. A signal processing apparatus comprising:

connectors having a number equal to the number of a plurality of channels that connect to plural kinds of data terminal equipment which operates under different interface conditions;

level conversion units having a number equal to the number of a plurality of channels that are connected to said connectors to convert levels of transmission signals and reception signals; and a DC branching unit that is connected to said level conversion units and has a DC branching function for said plurality of channels in said level conversion units, wherein connection is controlled between said data terminal equipment and circuit end equipment provided at a data circuit side, by said DC branching unit.

* * * * *